(12) United States Patent
Obrien et al.

(10) Patent No.: US 8,727,548 B1
(45) Date of Patent: May 20, 2014

(54) FIELD STEERING MIRROR

(75) Inventors: Michael Joseph Obrien, Rochester, NY (US); William Bradley Smith, Honeoye Falls, NY (US)

(73) Assignee: Exelis, Inc., McLean, VA (US)

( * ) Notice: Subject to any disclaimer, the term of this patent is extended or adjusted under 35 U.S.C. 154(b) by 180 days.

(21) Appl. No.: 13/347,032

(22) Filed: Jan. 10, 2012

Related U.S. Application Data

(63) Continuation-in-part of application No. 12/507,296, filed on Jul. 22, 2009, now Pat. No. 8,128,246.

(51) Int. Cl.
*G02B 7/182* (2006.01)
(52) U.S. Cl.
USPC ............................................ 359/872
(58) Field of Classification Search
USPC .......... 359/200.7, 201.1, 201.2, 212.1–214.1, 359/223.1–226.1
See application file for complete search history.

(56) References Cited

U.S. PATENT DOCUMENTS

| | | | |
|---|---|---|---|
| 7,643,196 B2 | 1/2010 | Bernstein et al. | |
| 2007/0139752 A1* | 6/2007 | Bernstein et al. | 359/224.1 |
| 2009/0225388 A1* | 9/2009 | Zaifrani et al. | 359/225.1 |

* cited by examiner

*Primary Examiner* — Euncha Cherry
(74) *Attorney, Agent, or Firm* — RatnerPrestia

(57) ABSTRACT

The present invention relates to a device for tilting a mirror. The device includes a mirror for reflecting light from an object, a plate for supporting the mirror, and a plurality of coils for providing tilt motion to the plate and mirror in response to current from a controller. The device also includes an electrically conductive diaphragm sandwiched between the mirror and the plate for stabilizing the tilt motion of the mirror. The current from the controller flows through the diaphragm to the coils.

19 Claims, 42 Drawing Sheets

US 8,727,548 B1

FIELD STEERING MIRROR

CROSS REFERENCE TO RELATED APPLICATIONS

This application is a continuation-in-part of pending U.S. Application Ser. No. 12/507,296, filed on Jul. 22, 2009, which is incorporated herein by reference in its entirety for all purposes.

FIELD OF THE INVENTION

This invention relates, generally, to a system for steering a mirror and protecting the mirror during acceleration. More specifically, this invention relates to including a diaphragm as part of an electrical circuit to drive the mirror, and including a controllable locking mechanism in the system for limiting the overall movement of the mirror during acceleration.

BACKGROUND OF THE INVENTION

In some mirror steering systems, non-linear motions may be encountered when tilting the mirror. This non-linear behavior may be partially manifested due to wires that are routed from the center of the mirror system to the outer drive coils that tilt the mirror, thereby resulting in inaccurate steering of the mirror (i.e. the wires interfere with the tilting of the mirror).

Another limitation that affects conventional steering mirror systems is mechanical stress introduced when the mirror system is accelerated (e.g. during a space launch). This acceleration may force the mirror to tilt beyond a safe limit, or even impact the housing on which it is mounted thereby causing stress and damage to the mirror system.

SUMMARY OF THE INVENTION

To meet this and other needs, and in view of its purposes, the present invention provides an apparatus for tilting a mirror.

In one example, the apparatus includes a mirror for reflecting light from an object, a plate for supporting the mirror, a plurality of coils for providing tilt motion to the plate and mirror in response to current from a controller, and an electrically conductive diaphragm sandwiched between the mirror and the plate for stabilizing the tilt motion of the mirror. In this example, the current from the controller flows through the diaphragm to the coils.

In one example, the apparatus includes installation tabs located in between a plurality of electrically isolated sectors of the diaphragm. The tabs hold each of the plurality of sectors together, and are removed after the diaphragm is sandwiched between the mirror and the plate.

In one example, the apparatus includes a plurality of sectors of the diaphragm that are electrically isolated from each other. The controller and the coils are electrically coupled to each other through at least four of the plurality of sectors. The current flows through the at least four of the plurality of sectors, and electrical contacts on an inner diameter and an outer diameter of the at least four sectors. The respective inner diameter electrical contacts of the at least four sectors are coupled to at least one coil. The respective outer diameter electrical contacts of the at least four sectors are coupled to the controller.

In one example, the apparatus includes clamp rings for mounting the electrically conductive diaphragm between the drive plate and the mirror, and insulating rings for electrically isolating the electrically conductive diaphragm from the clamp rings.

In one example, the apparatus includes a serpentine pattern cutout of the electrically conductive diaphragm such that each sector has an electrically conductive path from an outer diameter of each sector to an inner diameter of each sector.

In one example, the installation tabs are located at an inner diameter and an outer diameter of the sectors.

In one example, the two sectors complete an electrical circuit between two series wired coils and two power terminals of the controller. The current provided by the controller flows from the outer diameter of the sectors to the inner diameter of the sectors and through the coils.

In another example, the present invention provides an apparatus for tilting a mirror. The apparatus includes a mirror for reflecting light from an object, a plate for supporting the mirror, a plurality of coils for providing tilt motion to the plate and the mirror in response to current from a controller, and an electrically conductive diaphragm sandwiched between the mirror and the plate for stabilizing the tilt motion of the mirror. The electrically conductive diaphragm includes at least four electrically isolated sectors, and the current from the controller flows through the at least four sectors to the coils.

In one example, the apparatus includes an outer diameter electrical terminals on each of the four sectors electrically coupled to the controller, and inner diameter electrical terminals on each of the four sectors electrically coupled to at least one of the coils. The inner diameter electrical terminals and the outer diameter electrical terminals are electrically coupled to each other through each of the four respective sectors, and the current flows from the controller to the outer diameter electrical contact through a respective sector to the inner diameter electrical contact, and through the at least one coil.

In one example, the apparatus includes a first pair of coils mounted to two opposite sides of the drive plate and wired in series with each other, and a second pair of coils being mounted to two other opposite sides of the drive plate and wired in series with each other. The first pair of coils are coupled to two inner diameter electrical contacts of a first pair of sectors, the second pair of coils are coupled to two inner diameter electrical contacts of a second pair of sectors, and the controller is coupled to the outer diameter electrical contacts of the first pair of sectors and the second pair of sectors.

In one example, the apparatus includes eight sectors of the electrically conductive diaphragm, and four coils mounted to four opposite sides of the drive plate. Each of the four coils is electrically coupled to inner diameter electrical contacts of two respective sectors, and the controller is electrically coupled to outer diameter electrical contacts of the eight sectors.

In one example, the apparatus includes installation tabs located between the sectors at an inner diameter and an outer diameter for holding the sectors together during installation. The tabs are cut after the diaphragm is installed into the apparatus.

In one example, the apparatus includes insulating rings electrically isolating the electrically conductive diaphragm from clamp rings that mount the diaphragm in the apparatus.

In one example, the apparatus includes insulating disks electrically isolating the electrically conductive diaphragm from a mirror support and the drive plate.

In another example, the present invention provides an apparatus for locking a steerable mirror in position. The steerable mirror includes a mirror supported by a drive plate that tilts the mirror. The apparatus includes a lock ring positioned adjacent to the drive plate. The lock ring includes a plurality of vertical and lateral limits extending from the lock ring, and a drive motor mechanically coupled to the lock ring. In a locked position, the drive motor is controlled to rotate the lock ring so that the vertical and lateral limits are positioned to restrict movement of the drive plate. In an unlocked position, the drive motor is controlled to rotate the lock ring so that the vertical and lateral limits are positioned to allow movement of the drive plate.

In one example, the lock ring is mounted in the apparatus below the drive plate and in between clamp rings. The vertical and lateral limits abut the drive plate when the drive plate moves more than a predetermined distance in the locked position.

In one example, the apparatus includes four tabs extending from the drive plate, and four pairs of limits extending from the lock ring. Each pair of limits including a vertical limit and a lateral limit positioned to overlap one of the tabs and restrict vertical and lateral movement of the tab when the apparatus is in the locked position.

In one example, the apparatus includes four tabs extending from the drive plate, and four pairs of limits extending from the lock ring. Each pair of limits including a vertical limit and a lateral limit positioned away from the tabs to allow vertical and lateral movement of the tab when the apparatus is in the unlocked position.

In one example, the distance between the limits and the tabs in the locked position is less than 0.010 inches.

In one example, the limits are manufactured from soft material that absorbs shock when contacting the drive plate.

DETAILED DESCRIPTION OF THE INVENTION

As will be described, the present invention provides a system for steering a mirror. The present invention includes a radial serpentine cutout pattern which reduces hoop and radial strain as the mirror is steered along two orthogonal axes. The present invention also includes sensors and circuitry for determining the position of the mirror in the two orthogonal axes.

Figure 1:
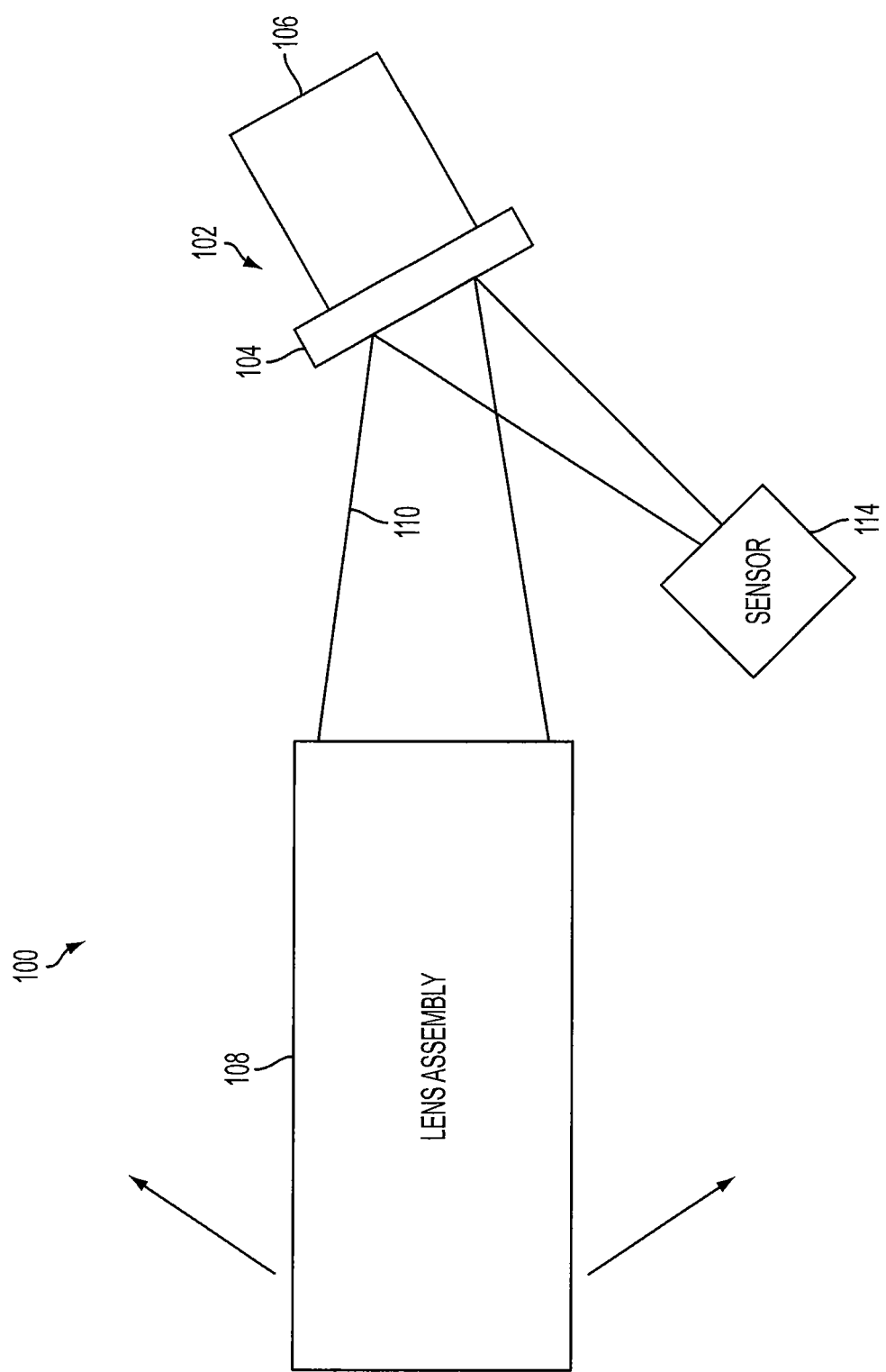
FIG. 1 is a block diagram of an image stabilization system utilizing a fast steering mirror.

Referring first to FIG. 1, there is shown an image stabilization system designated as 100, including fast steering mirror (FSM) 102, lens assembly 108 and sensor 114. The FSM 102 includes steering module 106 and mirror 104. In general, the FSM may compensate for motion in the lens assembly in order to maintain optical alignment with sensor 114. As light beam 110 exits lens assembly 108, the light beam is reflected by mirror 104 and received by sensor 114. As lens assembly 108 moves due to unwanted jitter, for example, mirror 104 may be rotated about two orthogonal axes in order to maintain optical alignment. Thus, mirror 104 may be steered by module 106 in order to tilt the mirror and remove jitter.

Figure 2:
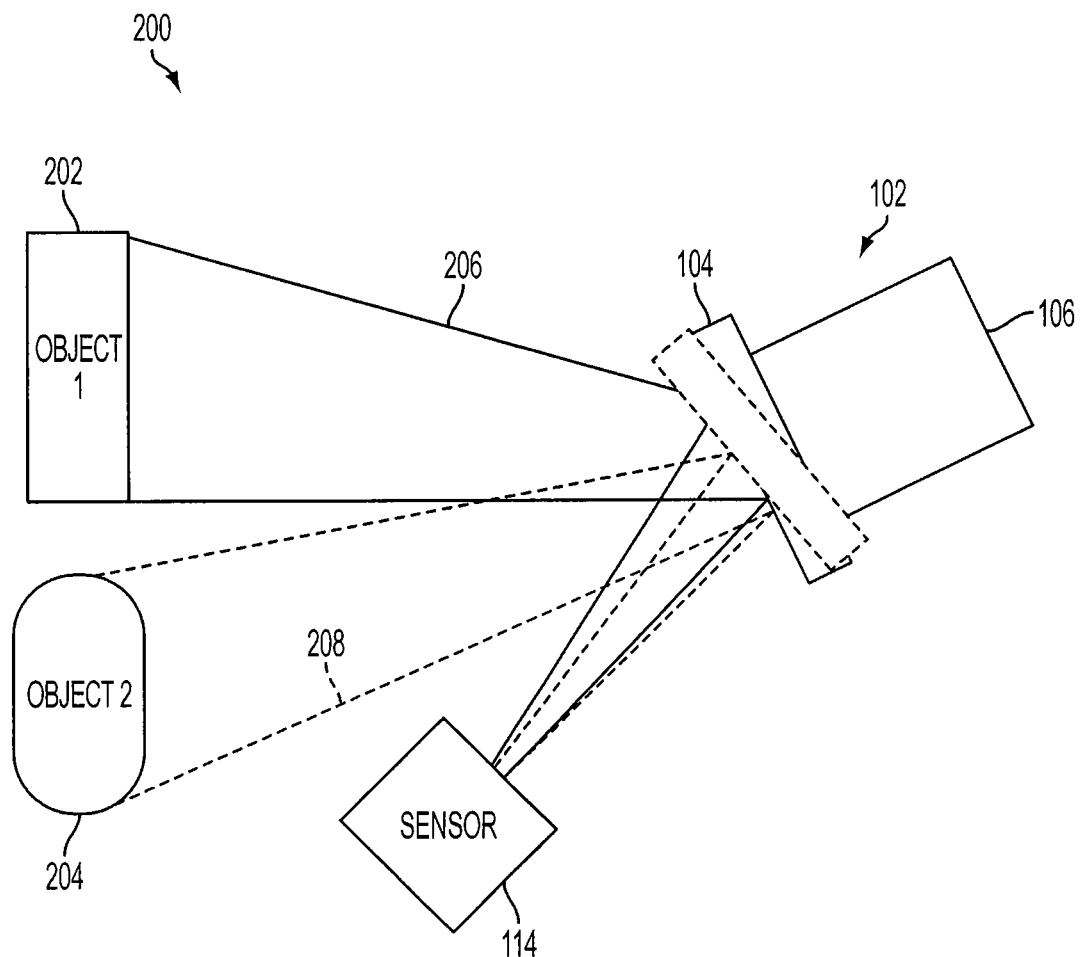
FIG. 2 is a block diagram of an image selection system utilizing a fast steering mirror.

In another embodiment, shown in FIG. 2, image selection system 200 includes FSM 102 and sensor 114 for imaging either object 202 or object 204 of a scene. As shown, the mirror reflects light from the objects onto sensor 114. When mirror 104 is tilted to a first position, the mirror reflects light beam 206 onto sensor 114. When mirror 104 is tilted to a second position, the mirror reflects light beam 208 onto sensor 114. Accordingly, FSM 102 steers mirror 104 to selectively reflect light from distinct objects onto sensor 114.

The following provides a description of FSM 102. Descriptions of sensing and computing the angular position of the mirror and steering the mirror are also provided.

Figure 3:
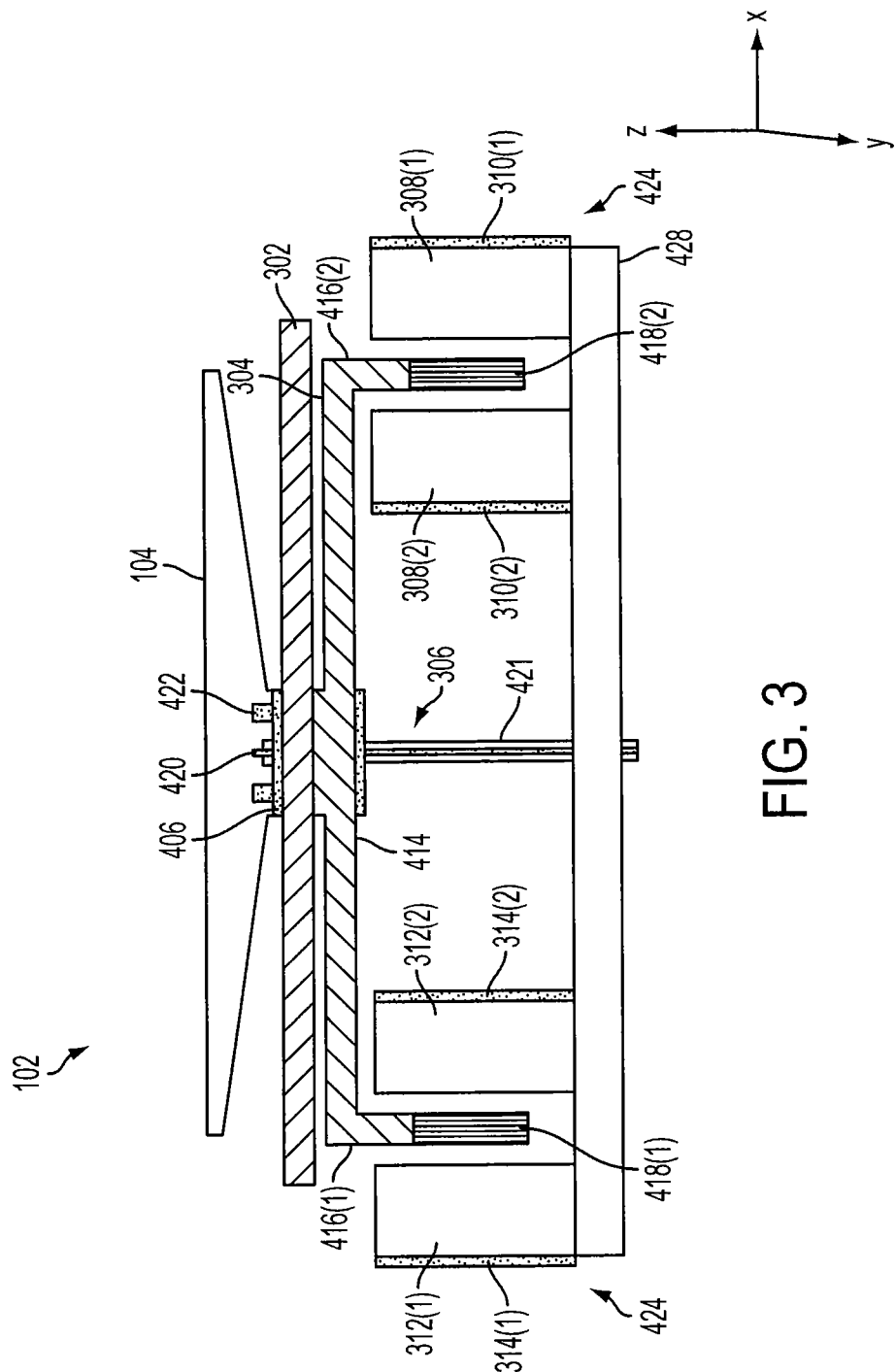
FIG. 3 is a simplified cross sectional view of the fast steering mirror shown in FIGS. 1 and 2.
Figure 4A:
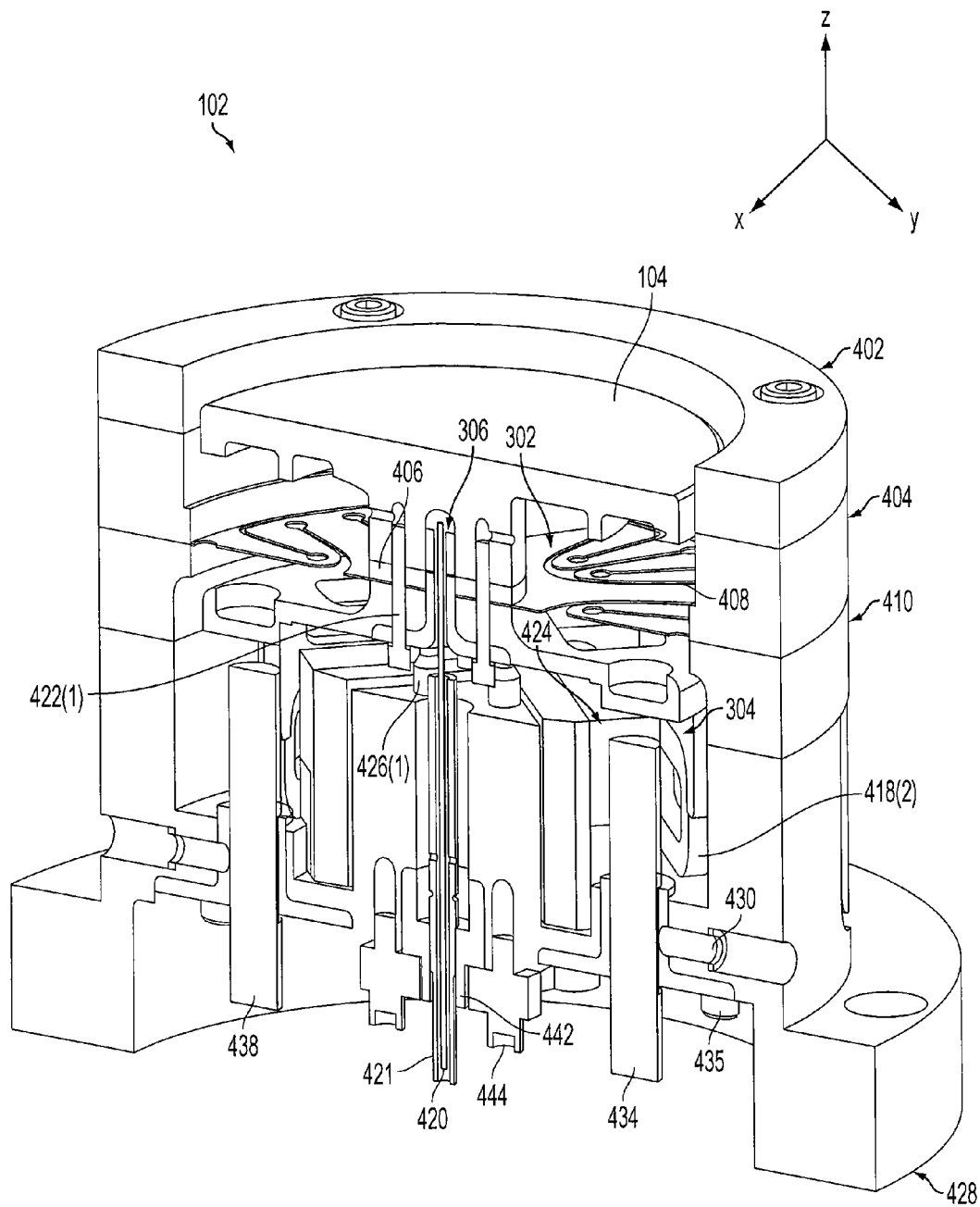
FIG. 4a is a cross sectional view of the fast steering mirror shown in FIGS. 1 and 2.
Figure 4B:
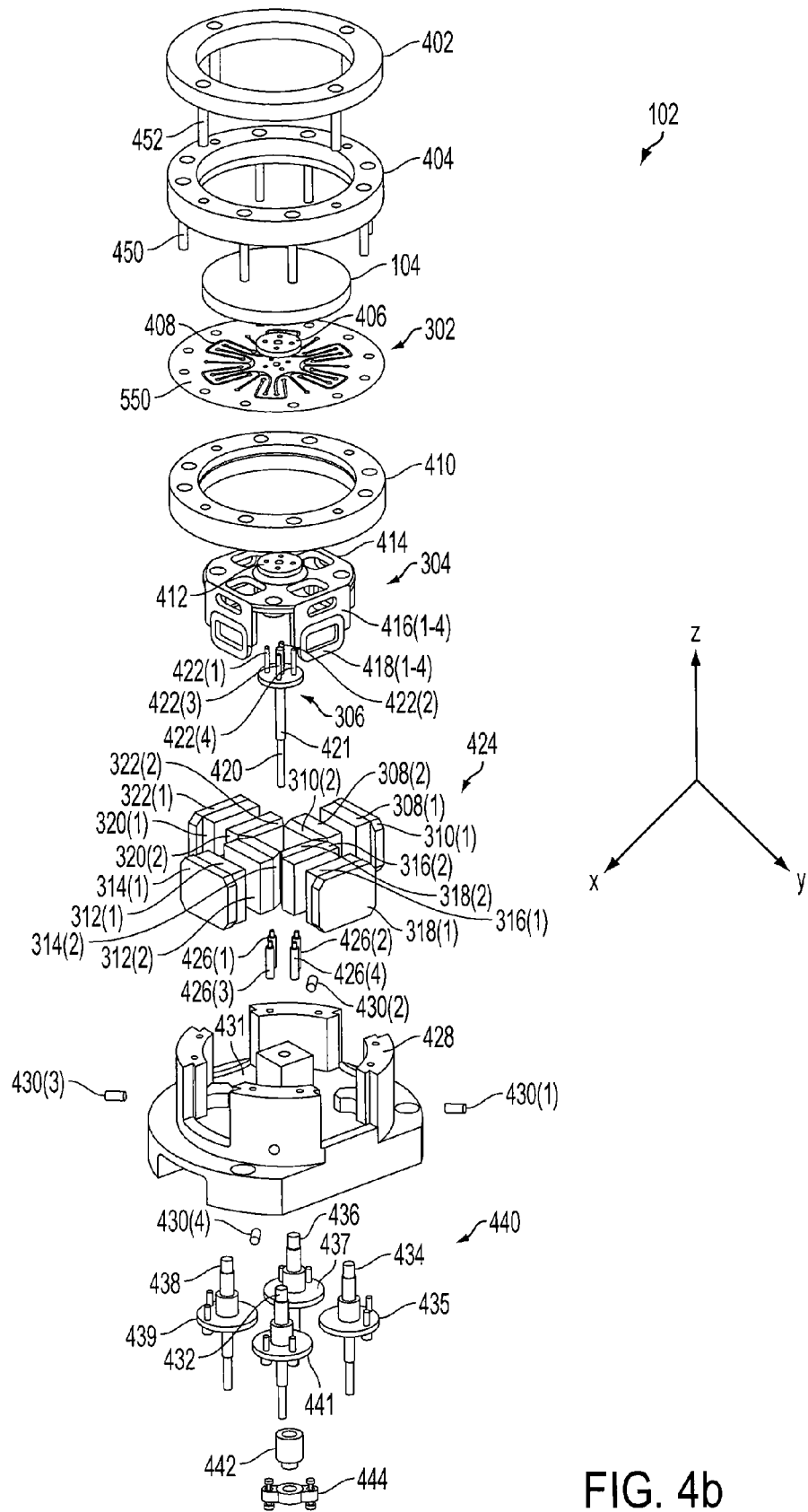
FIG. 4b is an exploded perspective view of the fast steering mirror shown in FIG. 3.

Referring now to FIGS. 3, 4*a* and 4*b*, there are shown a simplified cross sectional view of FSM 102, a detailed cross sectional view of FSM 102, and an exploded view of FSM 102 respectively. As shown, FSM 102 includes mirror 104, diaphragm 302, drive plate assembly 304, rod flexure assembly 306, magnet assembly 424 and base 428.

Drive plate assembly 304 includes a top rigid body 414 that extends in the X and Y directions. Drive plate assembly 304 also includes four yokes 416(1)-416(4), extending in the Z direction and perpendicular to top rigid body 414. The yokes, which are arranged 90 degrees apart from each other and include four respective coils 418(1)-418(4), are sandwiched between respective four pairs of magnets of magnet assembly 424. As best shown in FIG. 4*b*, the four pairs of magnets are designated as 308(1, 2), 312(1, 2), 316(1, 2) and 320(1, 2).

Flexible diaphragm 302, which is disposed above the top of rigid body 414, includes an outer circumference that is fixed between upper clamp ring 404 and lower clamp ring 410. The clamping is accomplished by inserting screws through holes 550 of flexible diaphragm 302. The diaphragm includes a radial serpentine pattern 408 formed from cutout portions in the material of diaphragm 302. The cutout portions allow the diaphragm to flex up or down in the Z axis independently with respect to the X and Y axes.

In general, diaphragm 302 and drive plate 304 are fastened together with screws 422 extending from rod flexure assembly 306 (shown in FIG. 4*b*). In addition, rod flexure assembly 306 includes central rod 420 encapsulated by an outer sheathing 421 which, at its upper end, extends through diaphragm 302 and into the lower surface of mirror 104. The lower end of central rod 420 passes through and extends in the Z axis below the bottom surface of base 428. Central rod 420 is fixed in position in the Z axis by end clamp 444 and coupling 442. In this manner, mirror 104 may be adjusted up or down in the Z axis and then fixed in a position relative to base 428. Furthermore, an axis of rotation of mirror 104 is defined by the central rod located in the center of base 428 and the plane of the flexible diaphragm 302.

Magnet assembly 424 includes four pairs of magnets spaced 90 degrees with respect to each other. Two of the four pairs of magnets are shown in a cross-sectional view in FIG. 3, as magnet pair 312(1,2) and magnet pair 308(1,2). Each pair of magnets is bordered by a respective pair of flux plates, designated as 314(1,2) and 310(1,2) for directing the magnetic flux. In general, each pair of magnets of magnet assembly 424 sandwiches a respective coil 418(1)-418(4), as shown in FIG. 4*b*.

When current flows, for example, through coils 418(1) and 418(2), the magnetic fields of the respective coils interact with each pair of magnets in a push/pull manner, thereby tilting drive plate assembly 304. For example, if a positive current flows through coil 418(1) and a negative current flows through coil 418(2), coil 418(1) may be effective to pull down on the drive plate assembly in the Z axis and coil 418(2) may be effective to push up on the drive plate assembly in the Z axis. This push/pull behavior allows drive plate assembly 304 to rotate about the X and Y axes with respect to the center of rotation defined by rod flexure assembly 306.

When drive plate assembly 304 rotates about the X axis, mirror 104 which is fixed to the drive plate assembly by screws 422, also rotates about the X axis. This rotation flexes diaphragm 302 in the Z axis. The flexing of diaphragm 302 provides a smooth linear tilting movement because of the serpentine cutout portions in the diaphragm material.

Although the cross sectional view shown in FIG. 3 shows a capability to rotate the mirror about a single axis (X axis) it will be understood that magnet assembly 424 includes two other pairs of magnets 316(1,2) and 320(1,2), shown in FIG. 4*b*, that interact, respectively, with coils 418(3) and 418(4) to provide rotation about an orthogonal axis (Y axis not shown).

According to an embodiment of the invention, an exploded view of FSM 102 is shown in FIG. 4*b*. As shown, FSM 102 includes mirror protection ring 402, outer clamp ring 404, mirror 104, mirror spacer plate 406, diaphragm 302 with a radial serpentine cutout pattern 408, lower outer clamp ring 410, drive plate assembly 304 including top rigid body 414, mirror flexure mount plate 412, and coil yokes 416(1)-416(4) for holding coils 418(1)-418(4). Also shown is the rod flexure assembly including central rod 420, outer sheathing 421 and rod flexure screws 422(1)-422(4). Furthermore, magnet assembly 424 includes magnet pair 308 (1,2), magnet pair 312(1,2), magnet pair 316(1,2) and magnet pair 320(1,2), corresponding flux plate pairs, namely flux plate pair 310(1, 2), flux plate pair 314 (1,2), flux plate pair 418(1,2) and flux plate pair 322(1,2). Further still, FSM 102 includes base 428, which includes snubbers 426(1)-426(4), sensor set screws 430(1)-430(4), sensor clamp plates 435, 437, 439 and 441, sensors 432, 434, 436 and 438, rod flexure end coupling 442 and end coupling clamp 444.

Sensor clamp plates 435, 437, 439 and 441 are mounted to the bottom surface of base 428 by screws. Sensors 432, 434, 436 and 438 are inserted in the center holes of respective sensor clamp plates. These four sensors are then fixed in a position in the Z axis by set screws 430(1)-430(4). The set screws screw into the outer surface of base 428 and extend from the inner surface of base 428 towards its center. Each set screw 430(1)-430(4) comes into contact with a respective sensor. In general, the four sensors are positioned to extend upwards in the Z axis from the base to position the sensors in close proximity to rigid body 414 of the drive plate assembly. Also, the four sensors are positioned at 45 degree angles with respect to both the X and Y axes.

Magnet assembly 424 as shown in FIG. 4b is inserted into the top opening of base 428, so that the four pairs of magnets and four pairs of flux plates rest on top of shelf 431 and are spaced within the four orthogonal quadrants of base 428. The two magnets within each of the four pairs of magnets is separated by a gap in order to receive a corresponding coil, as described above.

Snubbers 426(1)-426(4) are inserted into the center holes of base 428 in order to provide a fixed stopping position for drive plate assembly 304. In general, the maximum tilt of the mirror is limited by the drive plate assembly butting against the four snubbers which extend upward in the Z axis from the center portion of base 428. The maximum tilt attainable by the mirror is adjusted by adjusting the height in which the snubbers extend upward in the Z axis.

Rod flexure assembly 306 is mounted in the center portion of base 428 above snubbers 426(1)-426(4). The central rod 420 encapsulated in sheathing 421 is inserted in a center hole of base 428 so that it protrudes below the bottom surface of base 428. The portion of sheathing 421 which protrudes below the base may be used to clamp the rod flexure assembly to the base by end coupling 442 and end clamp 444.

The four screws 422(1)-422(4) of central rod assembly 306 protrude upward in the Z axis from the center mount of base 428 in order to couple together drive plate assembly 304, diaphragm 302, mirror spacer plate 406 and mirror 104. Central rod 420 and screws 422(1)-422(4) are inserted through the holes of mirror/flexure mounting plate 412, diaphragm 302 and mirror spacer plate 406. Rod flexure screws 422(1)-422(4) and the top portion of central rod 420 terminate inside the bottom portion of mirror 104 (shown in FIG. 4a). Specifically, the four screws mate with female threads in the bottom portion of mirror 104, and the central rod 420 mates with a cavity in the bottom portion of mirror 104.

Diaphragm 302, as shown in FIG. 4b, includes outer mounting holes 550 surrounding the outer circumference of the diaphragm. Outer mounting holes 550 of diaphragm 302 are aligned with the holes in lower outer clamp ring 410 and upper outer clamp ring 404. Screws 450 pass through the outer holes in ring 404, diaphragm 302 and ring 410. Screws 450 are then screwed into female threads of the four quadrants of base 428. Furthermore, mirror protection ring 402 is mounted on upper outer clamp ring 404 for protecting the mirror. Mirror protection ring 402 is mounted with screws 452 being screwed into corresponding female threads in upper outer clamp ring 404.

In operation, as drive plate 304 rotates about the X and Y axes, diaphragm 302 is flexed in the Z axis. The flexing characteristics of the diaphragm affects the overall tilt of the mirror. In one embodiment of the invention, diaphragm 302 has a cutout portion, referred to herein as a radial serpentine pattern, shown as serpentine pattern 500 in FIG. 5a. Radial serpentine pattern 500 includes six three-legged inner cutouts 514, 516, 518, 520, 522 and 524, and six two-legged outer cutouts 502, 504, 506, 508, 510 and 512. The inner cutouts extend from a common location and branch toward the outer circumference of diaphragm 302. The outer cutouts extend from a common location and branch toward the center of diaphragm 302. The three-legged inner cutouts and two-legged inner cutouts in this embodiment are interlaced with each other.

By forming serpentine pattern 500 in diaphragm 302, tilting of the mirror about one axis becomes independent of tilting the mirror in another axis. For example, rotation about the X axis has little or no affect on rotation about the Y axis. This independence is achieved because hoop and radial strains are reduced by serpentine cutout pattern 500. In operation, as drive plate assembly 304 rotates about the X and Y axes, mirror 104 presses against and flexes on diaphragm 304 which provides a smooth linear tilting motion.

Figure 5A:
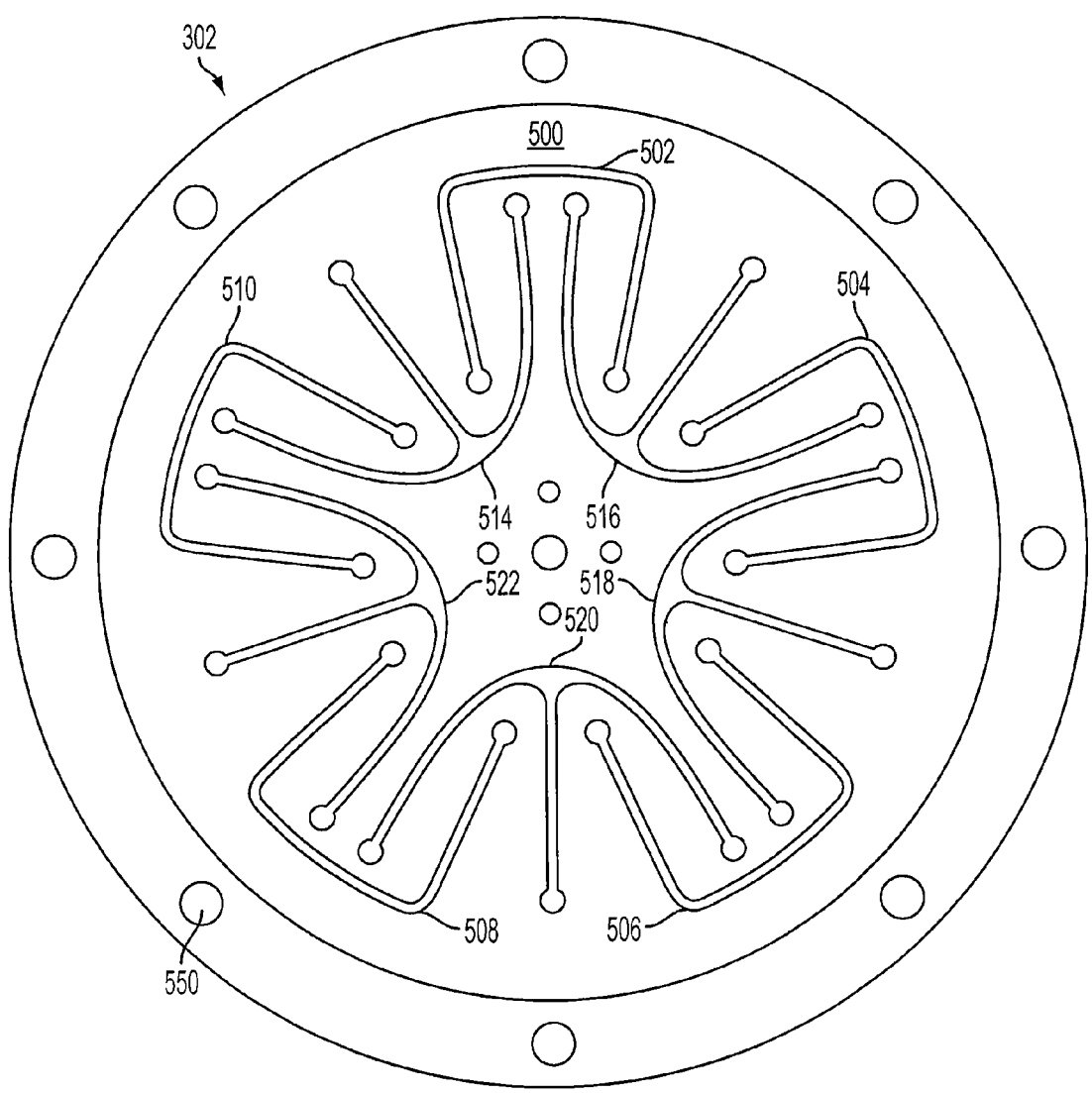
FIG. 5a is a top perspective view of a diaphragm with a radial pattern cutout having five cutout portions.
Figure 5B:
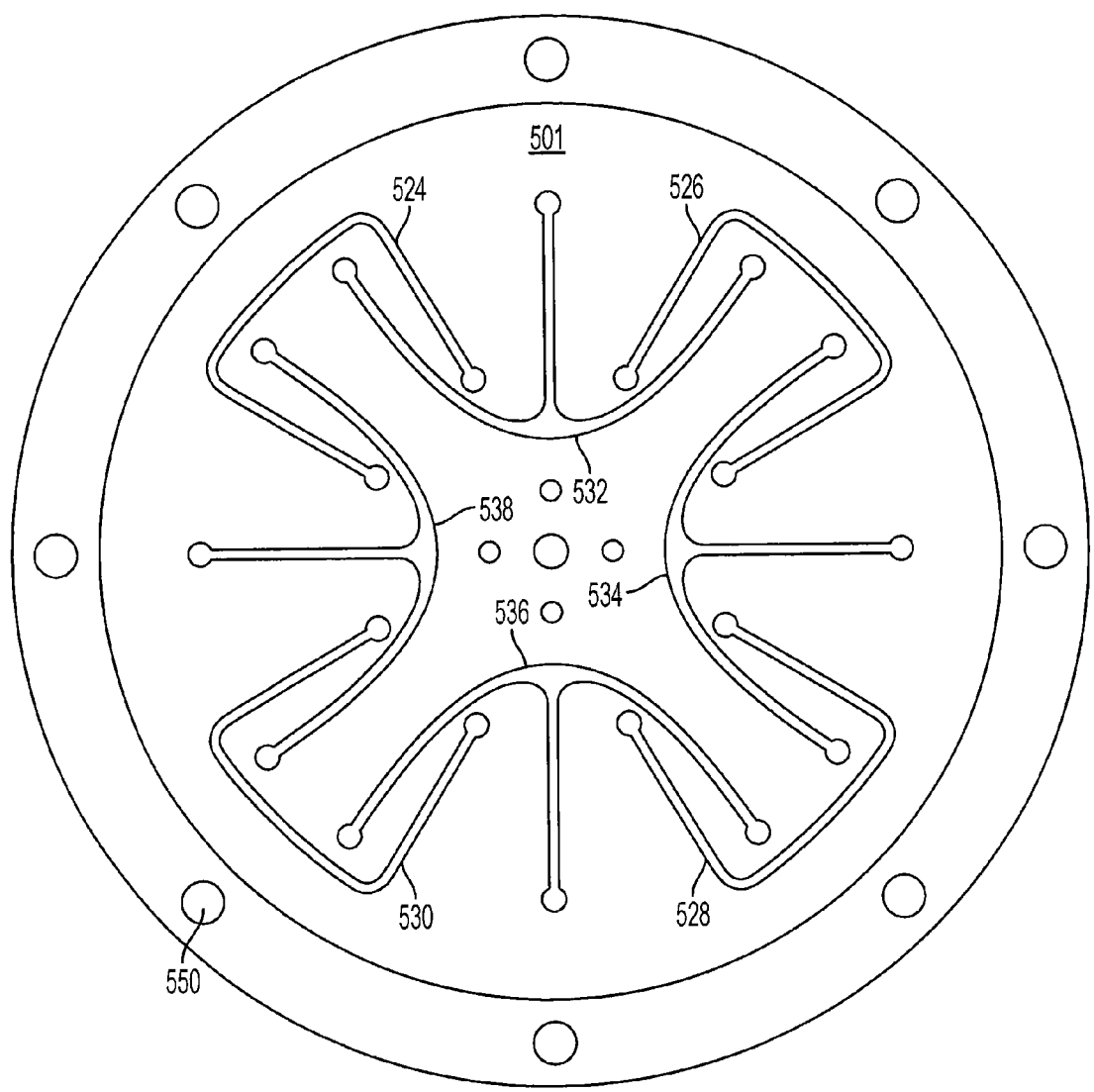
FIG. 5b is a top perspective view of a diaphragm with a radial pattern cutout having four cutout portions.
Figure 5C:
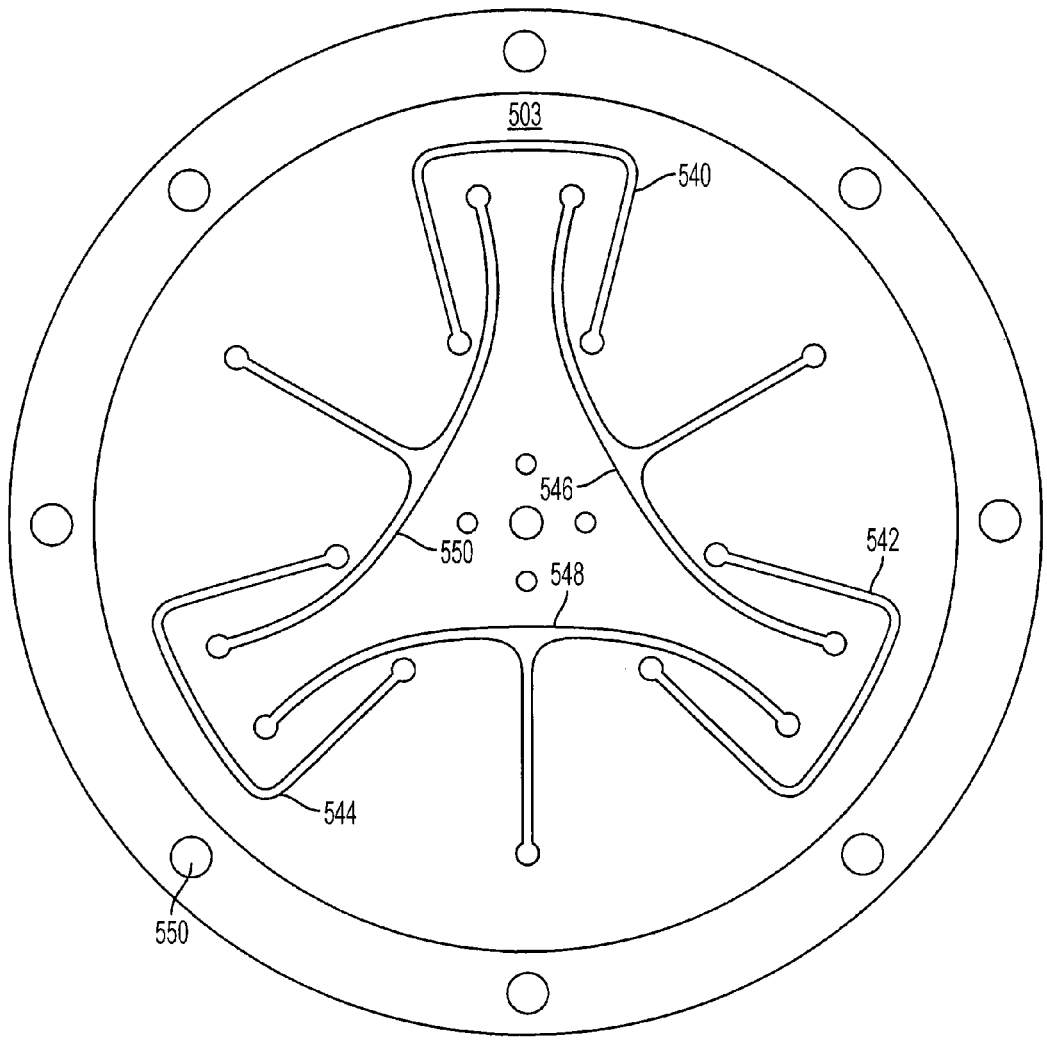
FIG. 5c is a top perspective view of a diaphragm with a radial pattern cutout having three cutout portions.

The radial serpentine pattern used by the diaphragm of the present invention may be different from that shown in FIG. 5a. For example, FIGS. 5b and 5c show radial serpentine patterns having four and three inner/outer cutouts respectively. In FIG. 5b, serpentine pattern 501 includes four outer cutouts extending towards the center of diaphragm 302 and four inner cutouts extending towards the outer circumference of diaphragm 302. Similarly, in FIG. 5c, serpentine pattern 503 includes three outer cutouts extending towards the center of diaphragm 302 and three inner cutouts extending towards the outer circumference of diaphragm 302. The inner and outer cutouts may be swapped in other embodiments. For example, the legs of inner cutouts 540, 542 and 544 in FIG. 5c may extend towards the outer circumference of diaphragm 302, while the legs of outer cutouts 546, 548 and 550 may extend towards the center of diaphragm 302. In other embodiments, the serpentine pattern cutout may include various numbers of inner/outer cutouts having various numbers of legs. The inner/outer cutouts may also be positioned at various angles with respect to the X and Y axes.

The serpentine pattern cutouts in FIGS. 5a-5c alter the rotational stiffness properties of diaphragm 302. One benefit to the serpentine pattern cutout is constant stiffness over the range of rotation. By providing constant stiffness at varying angles of rotation, the rate of power consumed by coils 418 (1)-418(4) to rotate drive plate assembly 304 also remains constant over the range of rotation. The radial serpentine pattern cutout also decreases the overall stress which allows the diaphragm thickness to be increased for tuning modes of vibration (modes of vibration are constant thought the range of travel). Furthermore, the radial serpentine pattern cutout allows the overall FSM system to benefit from low hysteresis and low sensitivity to assembly errors such as out of plane flatness.

Figure 5D:
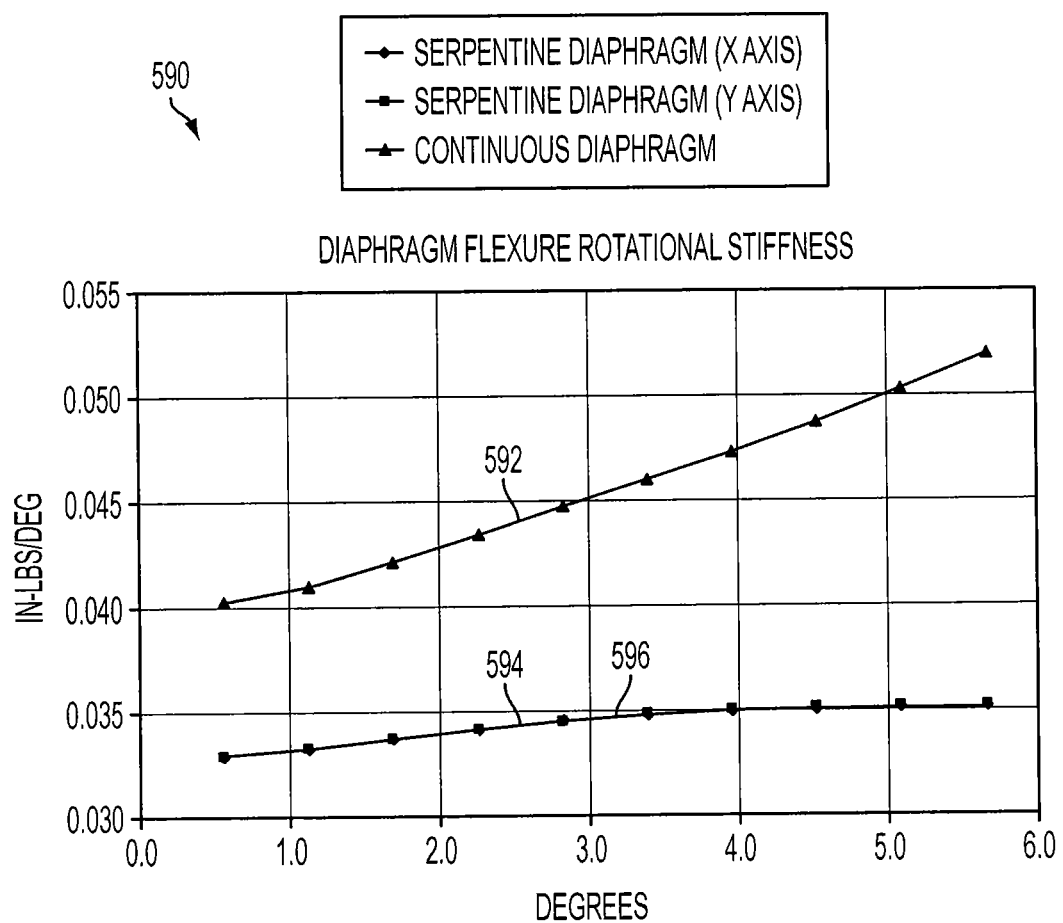
FIG. 5d shows plots of rotational stiffness of a diaphragm with a radial pattern cutout and a diaphragm without a radial pattern cutout.

FIG. 5d shows two data plots for comparing the rotational stiffness between two distinct diaphragms. Specifically, one of the diaphragms (diaphragm in FIG. 5a) has a serpentine pattern cutout and the other diaphragm does not have a radial serpentine pattern cutout. Curves 594 and 596 (rotational stiffness of X and Y axis respectively) show that the diaphragm having the radial serpentine cutout has a slight increase in rotational stiffness from roughly 0.033 in-lbs/deg at 0.05 degrees of rotation to roughly 0.035 in-lbs/deg at 4 degrees of rotation. At rotations greater than 4 degrees, the rotational stiffness of the diaphragm does not significantly increase (rotational stiffness remains constant at 0.035). Also, curves 594 and 596 for both the X and Y axis, exhibit substantially similar stiffness over the entire range of rotation due to the overall symmetry of the radial serpentine pattern cutout.

In contrast, curve 592 shows that the continuous diaphragm without the radial serpentine pattern cutout has a steady increase in rotational stiffness from roughly 0.04 in-lbs/deg at 0.05 degrees of rotation to roughly 0.052 in-lbs/deg at 5.5 degrees of rotation. Therefore, the continuous diaphragm without the radial serpentine pattern cutout does not provide a constant stiffness over the range of rotation.

FIGS. 6-11 are now described to show the positional relationship and interaction between the various components of the FSM system.

Figure 6:
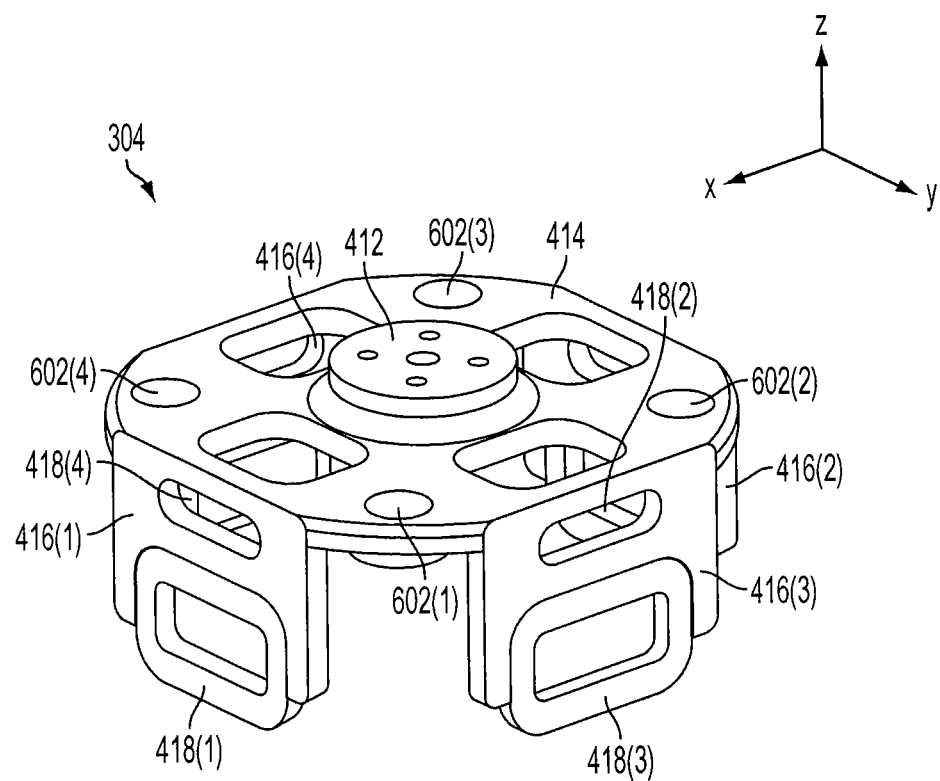
FIG. 6 is perspective view of the drive plate assembly shown in FIG. 4b.

As shown in FIG. 6, four drive coils 418(1)-418(4) are mounted in four drive yokes 416(1)-416(4) at 90 degree increments around drive plate assembly 304. Targets 602(1)-601(4) of rigid body 414 are located at 45 degree angles with respect to the X and Y axes. It will be later described that the four targets 602(1)-602(4) are aligned with the proximity sensors which act as detection targets for the four sensors. Flexure plate 412 in the center of rigid body 414 includes four screw holes and a center hole for receiving screws 422(1)-422(4), sheathing 421 and rod 420. Screws 422(1)-422(4) and rod 420 are passed through the bottom surface of 412 and extend from the top surface of 412 in the Z axis (shown in FIG. 4*a*).

Figure 7:
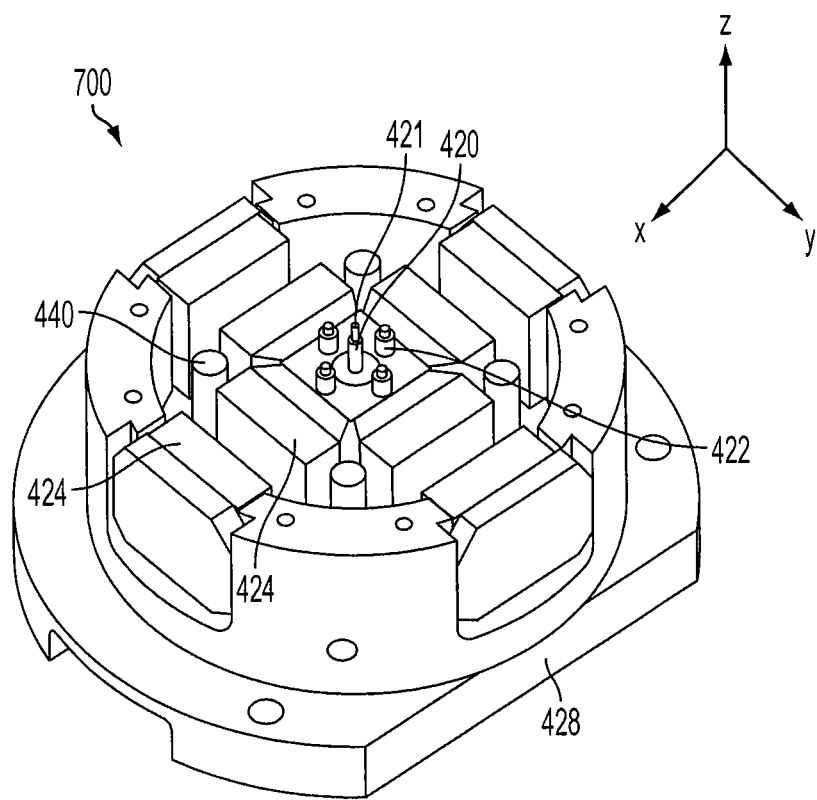
FIG. 7 is a perspective view of a magnet assembly and rod flexure assembly shown in FIG. 4b.

System 700 of FIG. 7 shows FSM 102 partially assembled. In system 700, and as previously described in FIG. 4*b*, magnet assembly 424, sensors 440 and rod flexure assembly 302 are mounted in base 428. Sensors 440 are mounted at 45 degree angles with respect to both the X and Y axes. Central rod 420 and screws 422(1)-422(4) extend from the center of base 428 in the Z axis and pass through the holes of flexure plate 412, diaphragm 302 and mirror spacer plate 406 (shown in FIG. 4*a*). As previously described, the magnets within each pair of magnets in system 700 is separated by respective gaps in which coils 418(1)-418(4) suspended from yokes 416(1)-416(4) are received.

Figure 8:
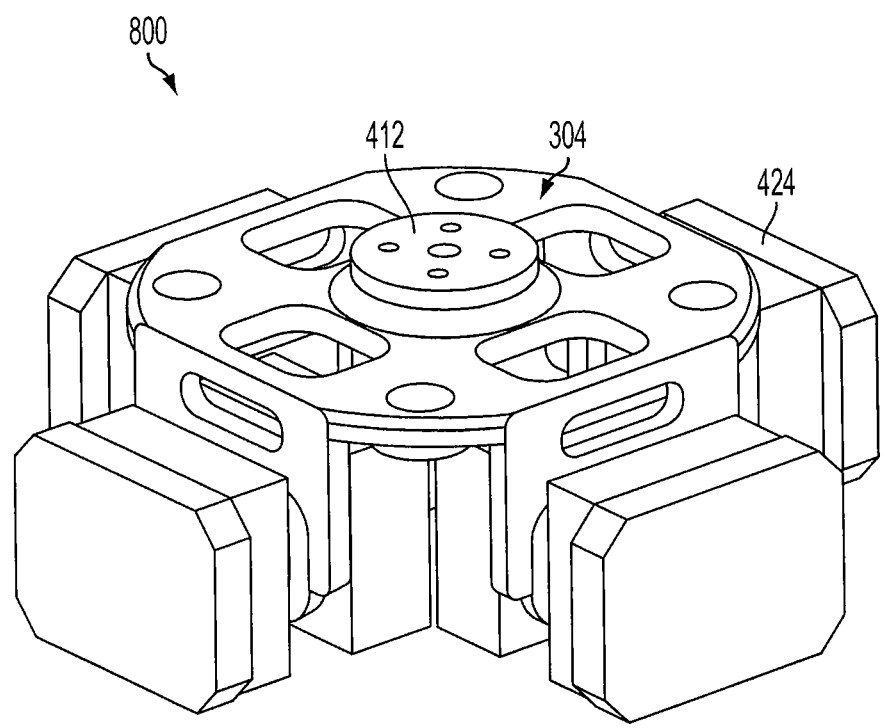
FIG. 8 is a perspective view of the drive plate assembly and the magnet assembly shown in FIG. 4b.

One example of the positional relationship between drive plate assembly 304 and magnetic assembly 424 is shown as system 800 in FIG. 8. Drive plate assembly 304 is mounted to the center of base 428 by passing screws 422(1)-422(4) and central rod 421 through the holes of flexure plate 412. In this configuration, coils 418(1)-418(4) are freely suspended in the four gaps sandwiched between magnet pairs 308(1,2), 312(1,2), 316(1,2) and 320(1,2).

The magnets of magnet assembly 424 generate a magnetic field adequate to accommodate the gap required to receive coils 418 of drive plate assembly 304. The gap between the magnets is large enough to provide room for the drive plate assembly to rotate freely in both the X and Y axes. Coils 418(1)-418(4) are vertically centered between the magnet pairs when the drive plate assembly is in the home position (not rotated). As the drive plate assembly rotates, each coil may then assume varying distances with respect to each magnet pair (the coils are no longer vertically centered).

Figure 9:
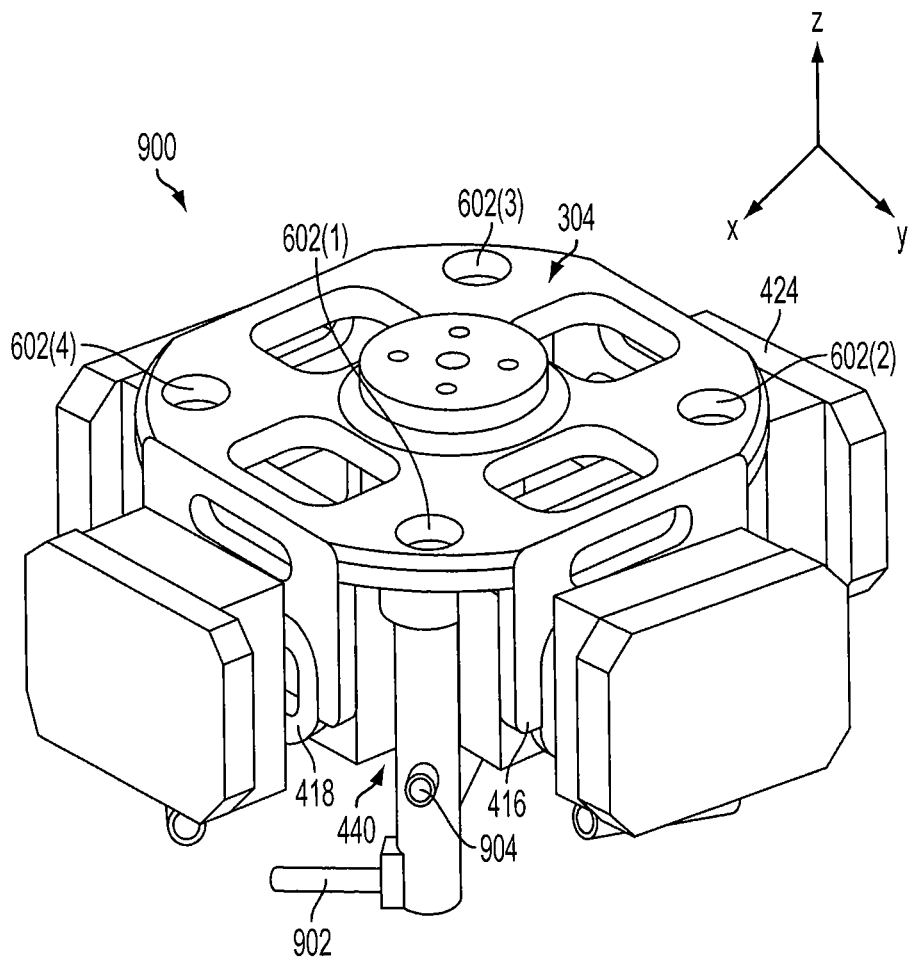
FIG. 9 is a perspective view of the drive plate assembly and the magnet assembly shown in FIG. 4b including proximity sensors.

System 900 of FIG. 9 shows system 800 with the addition of proximity sensors 440. Sensors 432, 434, 436 and 438 are aligned in the X and Y axis with sensor targets 602(1)-602(4) respectively. Each of the four sensors inductively determine their respective distances to the respective sensor targets. In general, the distance from the sensors to the respective sensor targets increases and decreases as drive plate 304 rotates about the X and Y axes.

Sensors 432, 434, 436 and 438 include ports 902 and 904 connected to internal magnetically coupled coils. Each of the sensors is powered by electrical current through one port and outputs an electrical signal through the other port. The electrical signal output from each sensor is proportional to the proximity of the sensor to the respective sensor target. The electrical signal output is then input to a detection circuit (shown in FIG. 17) to determine the X and Y position of mirror 104.

Figure 10:
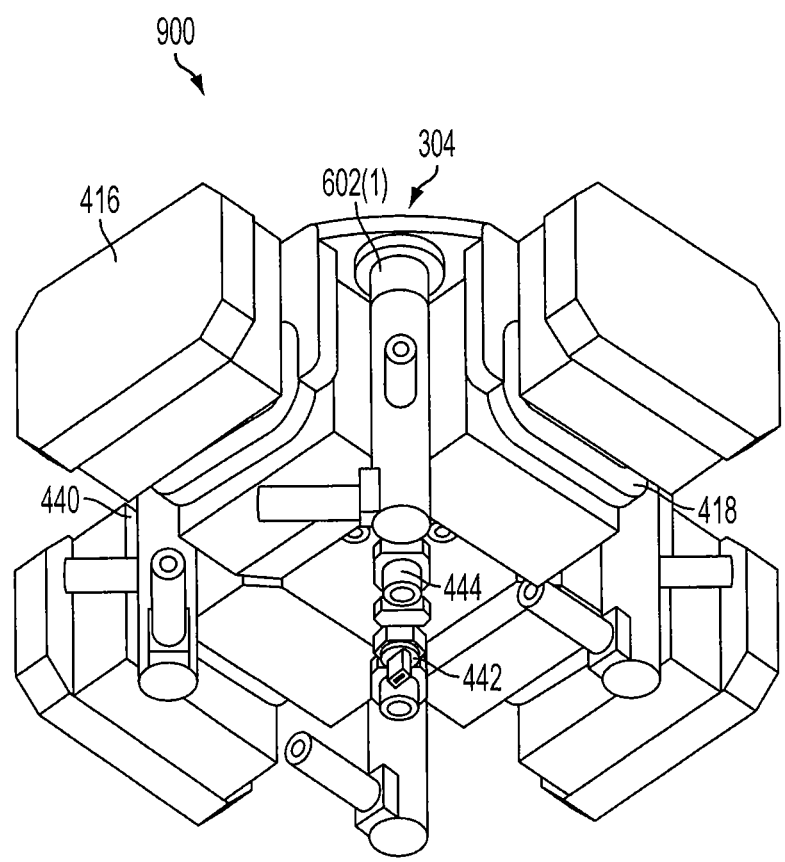
FIG. 10 is a bottom perspective view of components shown in FIG. 9 including a rod flexure coupling and a rod flexure clamp.

Rod flexure end coupling 442 and end coupling clamp 444 are shown in FIG. 10 which is a bottom view of system 900 in FIG. 9. In FIG. 10, rod flexure end coupling 442 is coupled to the bottom of sheathing 421 which is exposed below the bottom surface of base 428. End coupling clamp 444 fixes end coupling 442 once a position for sheathing 421 is acquired. This configuration allows central rod 420 to be vertically adjusted in the Z axis and clamped in position. The vertical position of central rod 420 may be adjusted up or down depending on the overall configuration of FSM 102. For example, the position of rod 420 may be adjusted to accommodate the part tolerances in the vertical direction.

Figure 11:
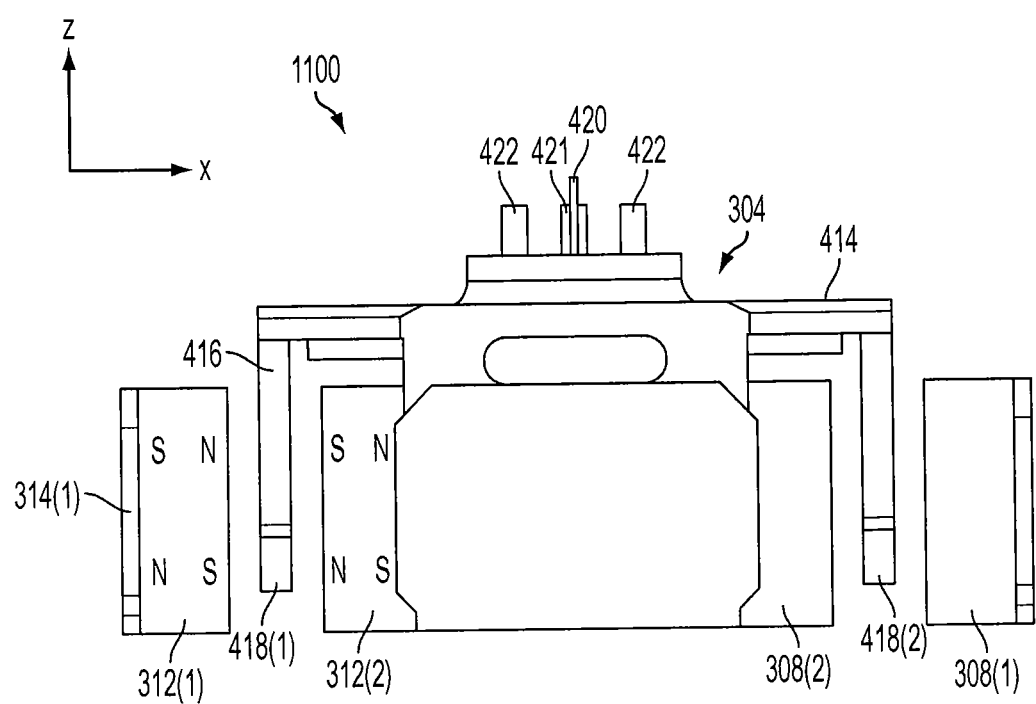
FIG. 11 is a cross sectional side view depicting positional relationships between the drive plate assembly and the magnet assembly shown in FIG. 4b.

Similar to FIG. 3, FIG. 11 shows a side cross sectional view of the positional relationship between coils 418(1), 418(2) and the pairs of magnets 308(1,2) and 312(1,2). Each of the pairs of magnets include two permanent magnets having a range such that a uniform high intensity field is formed in the gap. Minimum flux and maximum gap flux are obtained by arranging the magnet pairs with opposite polarity across each respective gap. As previously described, depending on the amplitude and polarity of the current flowing through coils 418(1) and 418(2), rigid body 414 may be pulled up or pushed down in the Z axis due to the opposing north and south polarities of permanent magnet pairs 312(1,2) and 308(1,2).

In general, coils 418(1)-418(4) are driven by an electrical current which induces a magnetic field around each respective coil. The magnetic field produced by each coil magnetically interacts with the stationary magnetic field of the permanent magnet pairs which sit perpendicular to the coil surface. This magnetic interaction generates a force in the Z axis which may either be an upward or downward force depending on the direction of current flow. In this embodiment, opposite coils (coils that are 180° from each other) are supplied with currents of opposite polarity to induce a push/pull behavior. For example, if a positive current flows through coil 418(1), a negative current will flow through coil 418(2). These opposing currents produce opposite magnetic fields which interact in an opposite manner with respective permanent magnet pairs. For example, the positive current flowing through coil 418(1) may result in an upward force being applied to one side of rigid body 414, while the negative current flowing through coil 418(2) may result in a downward force being applied to the opposite side of rigid body 414.

Central rod 420 which defines the center of rotation for drive plate assembly 304, is inserted into the bottom of mirror 104 which limits the movement of mirror 104 in the Z direction. If the mirror pushes down on central rod 420 in the Z axis, then central rod 420 will bend slightly. Since rod 420 is encapsulated by outer sheathing 421 (shown in FIG. 4*a*), however, the maximum amount of bend is limited. For example, as rod 420 bends, a portion of rod 420 will abut the outer sheathing 421 which thereby restricts the maximum distance the rod may bend. By restricting the bending of central rod 420, the movement of mirror 104 in the Z axis is also restricted.

Figure 12:
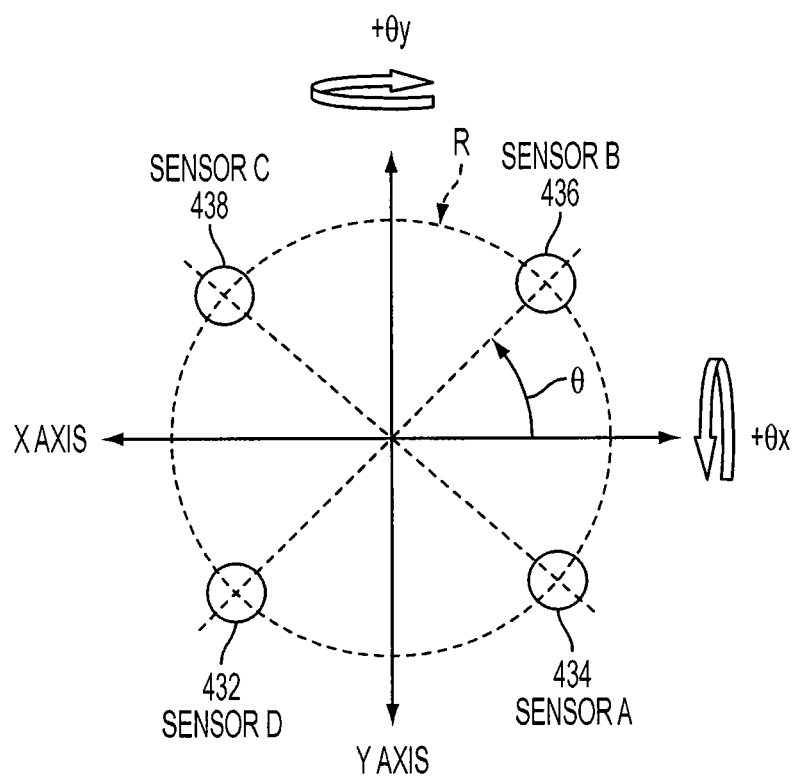
FIG. 12 is a diagram depicting angular positions of sensors A-D with respect to two axes of rotation.

As previously described, angular positioning about both the X and Y axes is measured by proximity sensors 440. A top view of the positioning of the proximity sensors relative to the X and Y axes is shown in FIG. 12. As described, the gaps between the four sensors and the four respective sensor targets increase or decrease as the drive plate assembly rotates about the X and Y axes. In the embodiment shown in FIG. 12, the gap between sensor target 602(2) and sensor A (sensor 434) and the gap between sensor target 602(1) and sensor D (sensor 432) both decrease equally with a positive angular rotation about the X axis. Similarly, the gap between sensor target 602(4) and sensor C (sensor 438) and the gap between sensor target 602(1) and sensor D (sensor 432) both decrease equally with a positive angular rotation about the Y axis.

In this embodiment, sensors A-D are positioned at 45 degree angles with respect to the X and Y axes, and at a constant radius to the axis of rotation (origin of the axes). This positioning provides equal sensitivity to detecting rotations about the X and Y axes. The 45 degree positioning also allows electronic decoupling of the X and Y axis even though the sensors are not directly aligned with either axis. Other angular positions for the sensors relative to the X and Y axes may be alternatively chosen. These alternative positions, however, should be mathematically decoupled to provide pure X and Y rotations.

Relative output voltages from each sensor for pure X and Y rotations are illustrated in FIGS. 13a-13d. In one embodiment, sensors (A-D) are configured such that the output voltage is maximum in the home position ($\theta x=\theta y=0$) and then decreases from the maximum voltage as the gap between the sensors and the drive plate targets is reduced. As the gap increases, no change in output voltage occurs (voltage stays at the maximum value).

Figure 13A:
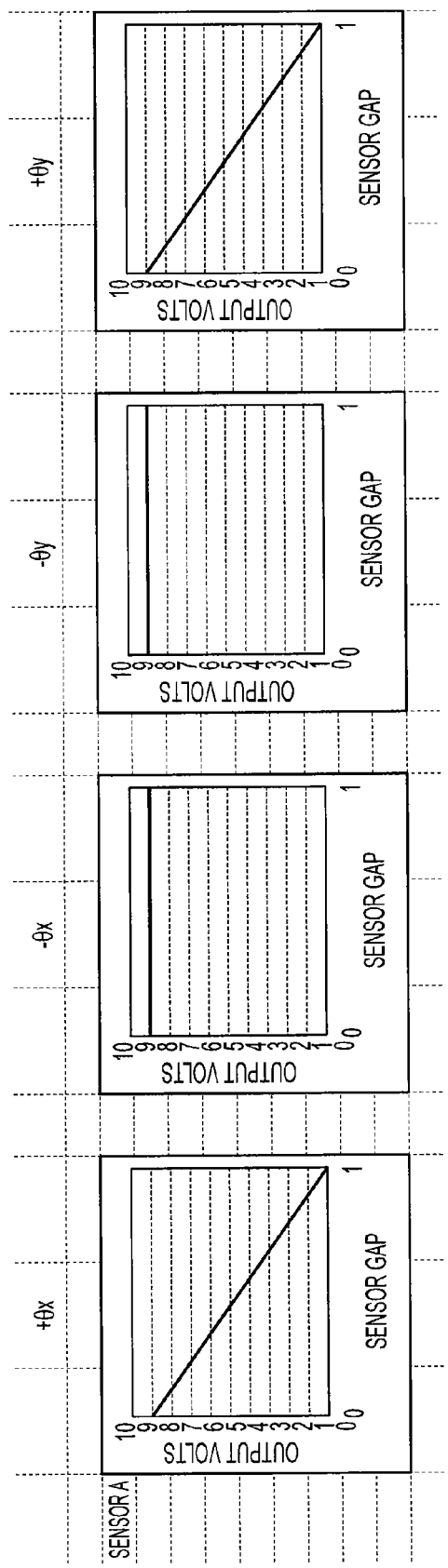
FIG. 13a depicts four plots of output voltages of sensor A resulting from angular rotation about the X and Y axes.
Figure 13B:
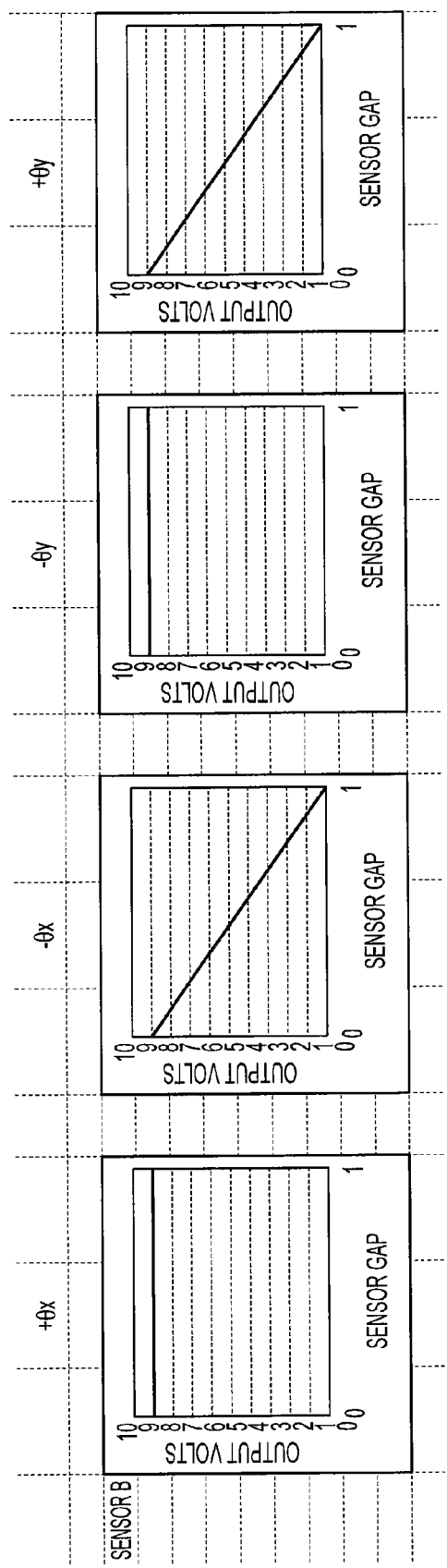
FIG. 13b depicts four plots of output voltages of sensor B resulting from angular rotation about the X and Y axes.
Figure 13C:
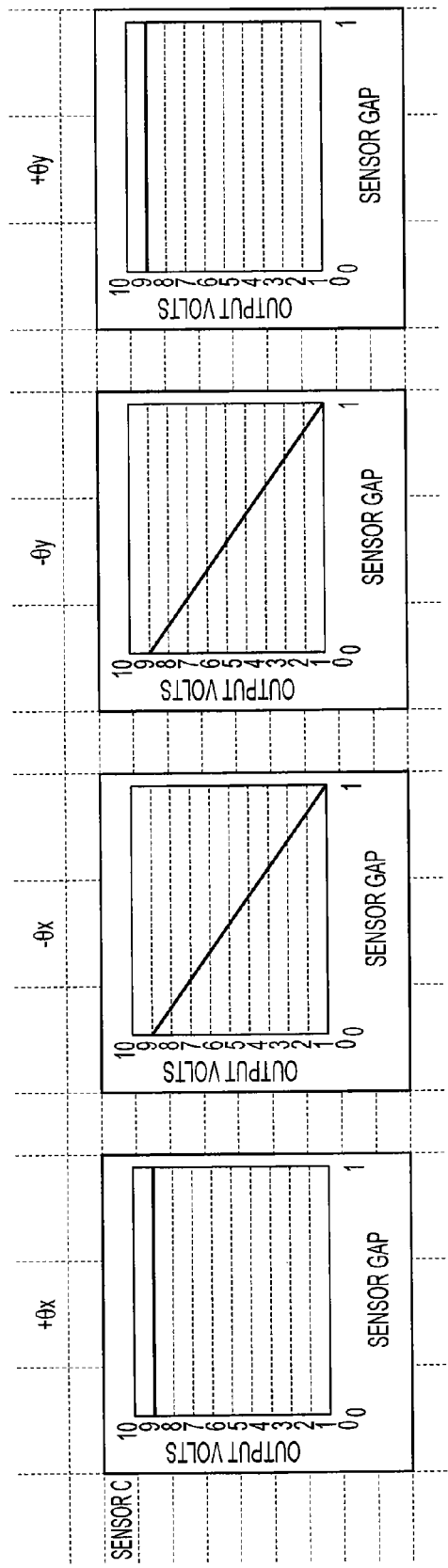
FIG. 13c depicts four plots of output voltages of sensor C resulting from angular rotation about the X and Y axes.
Figure 13D:
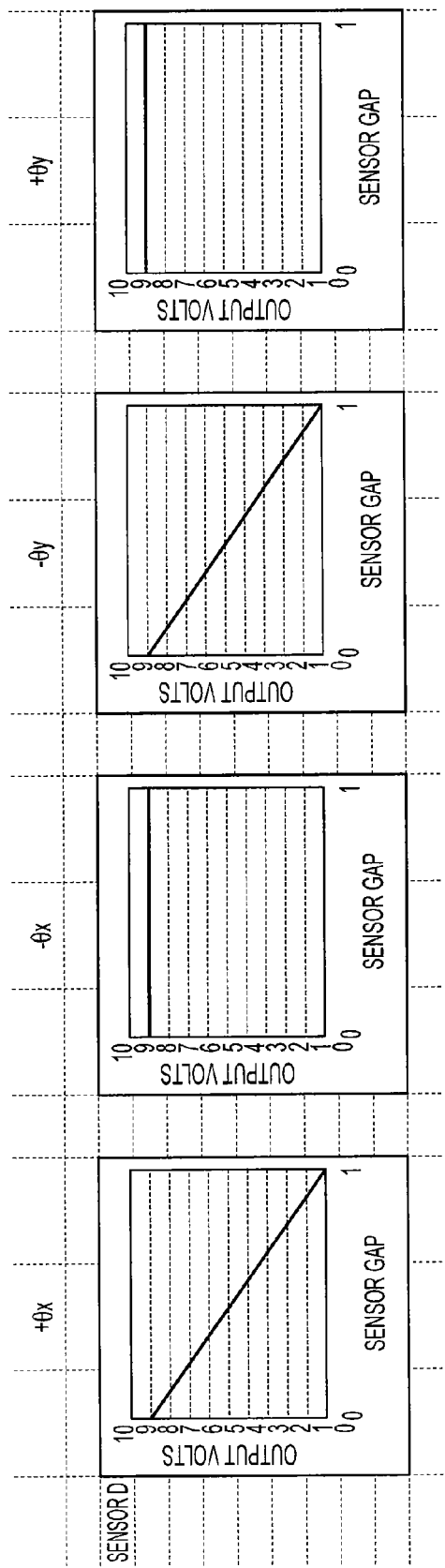
FIG. 13d depicts four plots of output voltages of sensor D resulting from angular rotation about the X and Y axes.

For example, in FIG. 13a, the output voltage of sensor A decreases with $+\theta x$ or $+\theta y$ rotations. This decrease in output voltage is due to the gap between sensor A and drive plate 414 being reduced with $+\theta x$ or $+\theta y$ rotations. Similarly, in FIG. 13b, the output voltage of sensor B decreases with $-\theta x$ or $+\theta y$ rotations. In FIG. 13c the output voltage of sensor C decreases with $-\theta x$ or $-\theta y$ rotations. Also, as shown in FIG. 13d, the output voltage of sensor D decreases with $+\theta x$ or $-\theta y$ rotations.

In one embodiment, the four proximity sensors are operated as two differential pairs for reducing common mode noise. For example, sensor pair (A and C) are positioned 180 degrees with respect to each other and sensor pair (B and D) are also positioned 180 degrees with respect to each other. Each of these sensor pairs are operated differentially (A operates differentially with C) and (B operates differentially with D). A continuous linear voltage proportional to angular position of drive plate assembly 304 may be realized if the output voltages of the two sensor pairs are differentially combined as differential voltages (A-C) and (B-D).

Figure 14A:
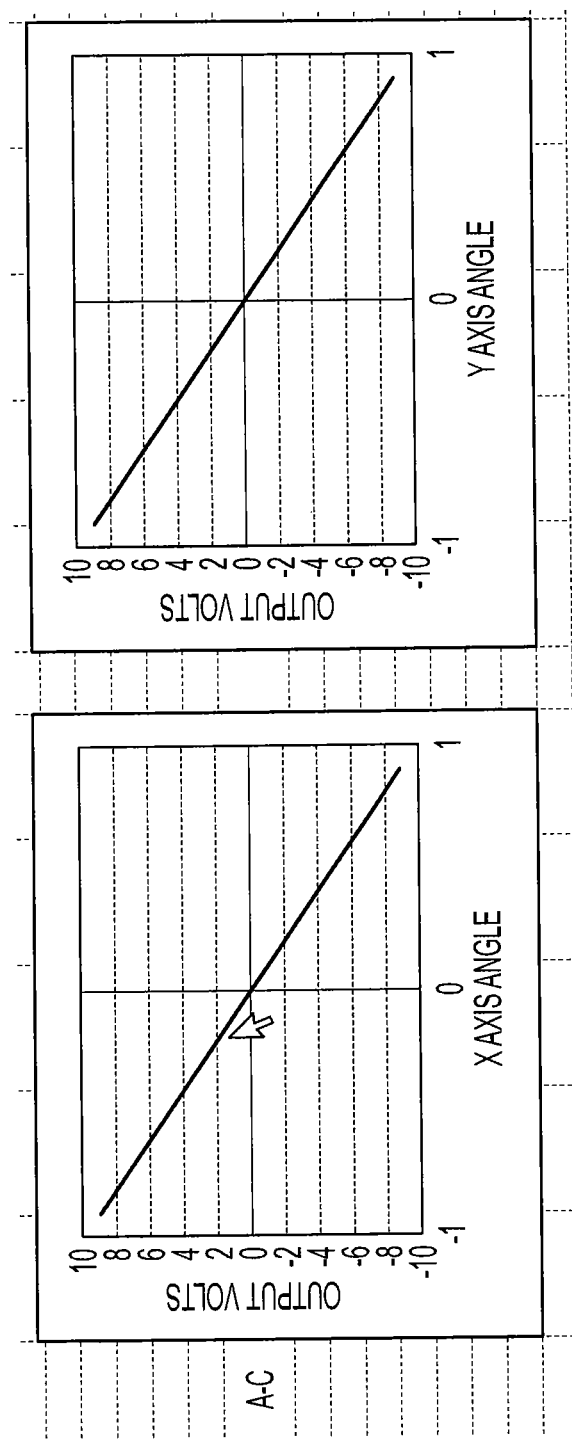
FIG. 14a depicts two plots of differential output voltages between sensors A and C.
Figure 14B:
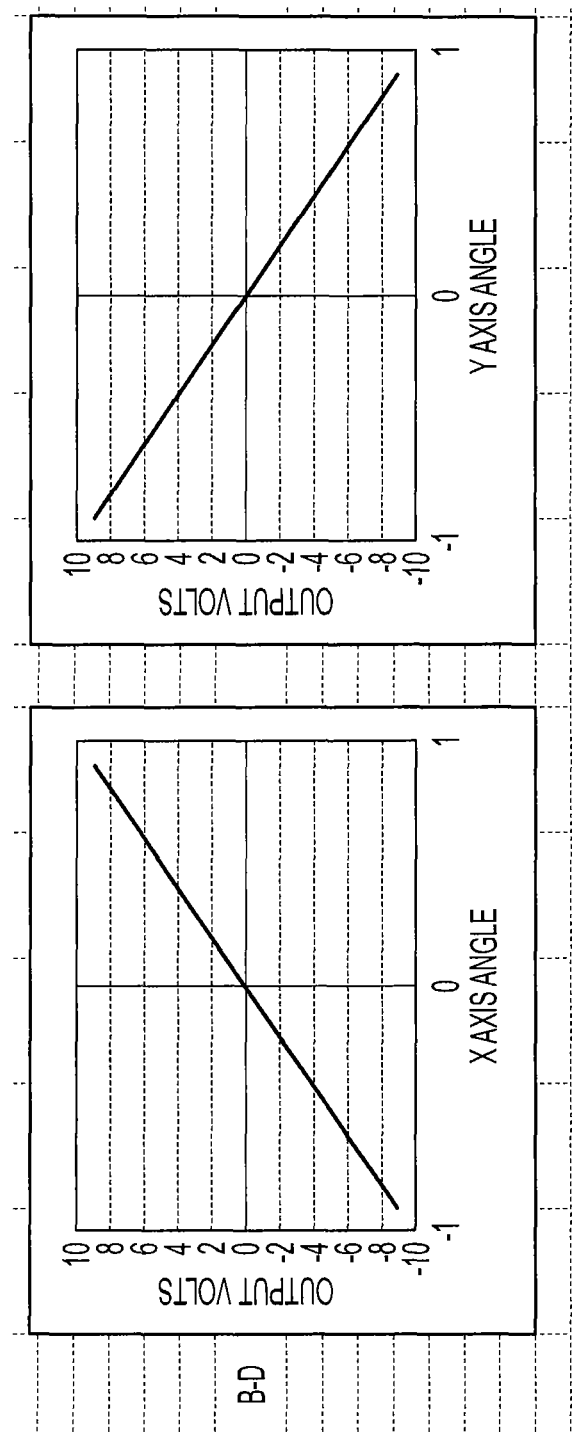
FIG. 14b depicts two plots of differential output voltages between sensors B and D.

The differential output voltages with respect to rotations about the X and Y axes are shown in FIGS. 14a and 14b respectively. In one example, the (A-C) differential voltage decreases linearly as both X and Y axes rotation angles vary from a maximum negative angle to a maximum positive angle. In another example, the (B-D) differential voltage increases linearly as the X axis rotation angle varies from a maximum negative angle to a maximum positive angle, whereas the (B-D) voltage decreases linearly as the Y axis rotation angle varies from the maximum negative angle to the maximum positive angle.

Figure 15A:
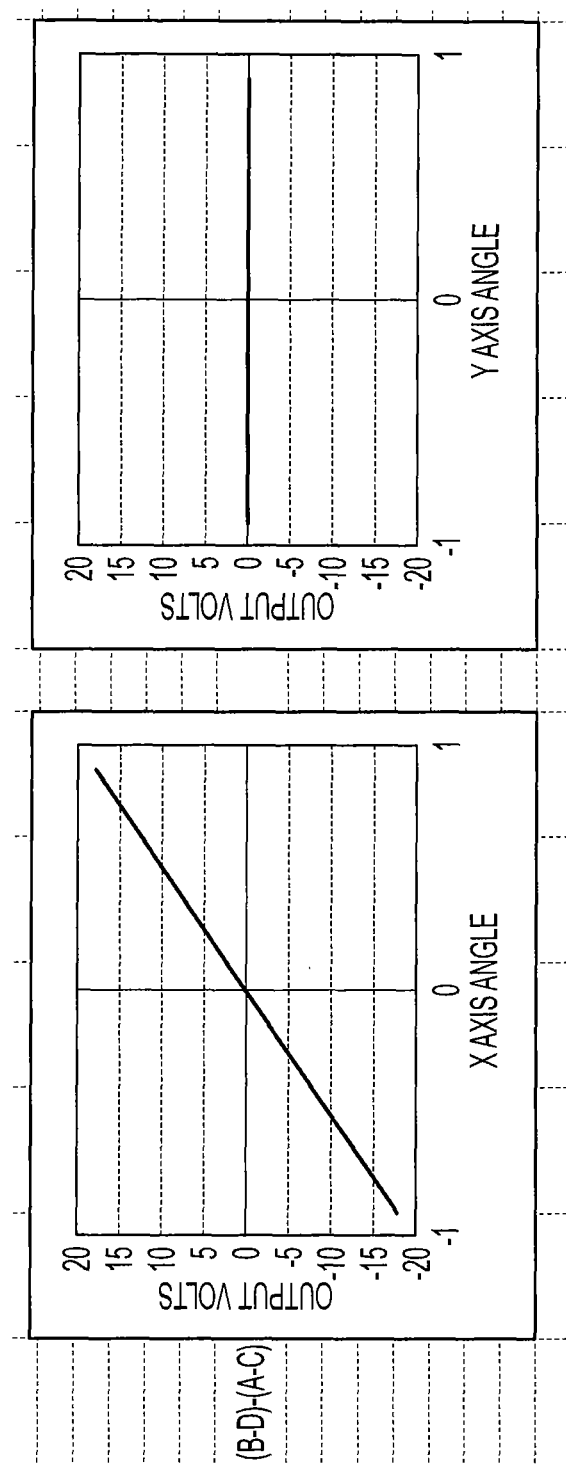
FIG. 15a depicts two plots of summed output voltages between the voltages shown in FIGS. 14a and 14b.
Figure 15B:
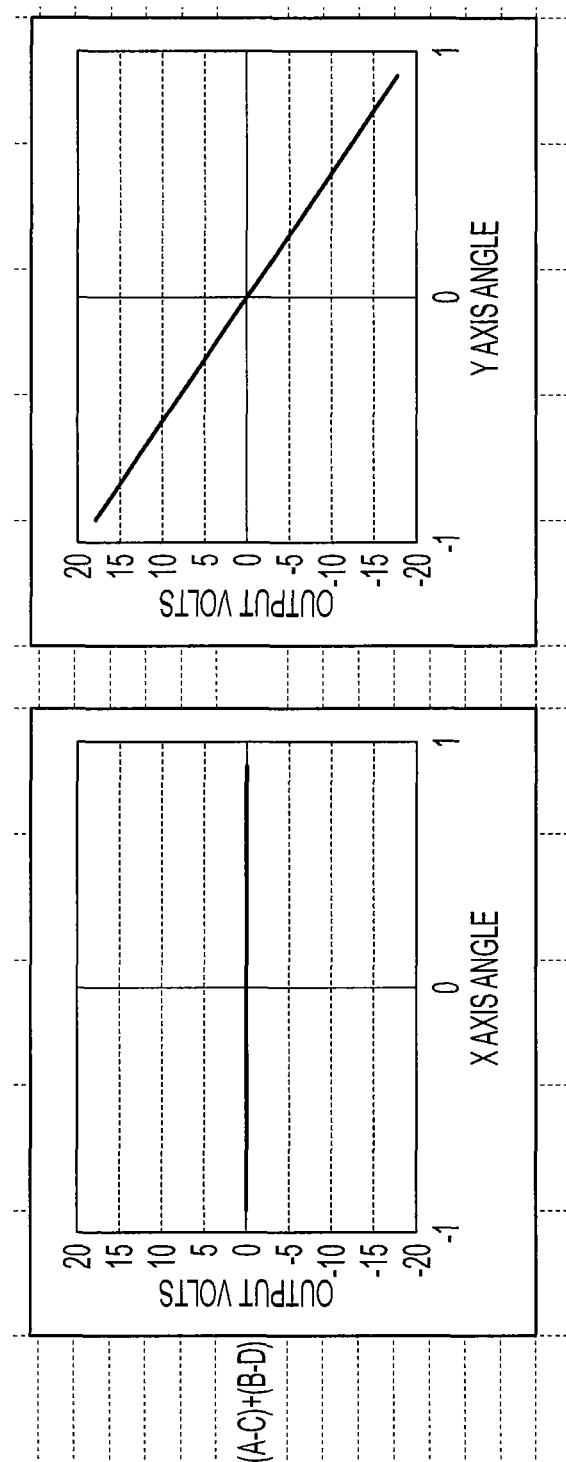
FIG. 15b depicts two plots of differential output voltages between the voltages shown in FIGS. 14a and 14b.

Determining the X and Y position of mirror 104 may be beneficial in performing mirror steering. Therefore, rotations in the X and Y axis are resolved into pure $\theta x$ and $\theta y$ components by computing the sum and differences of the differential output voltages in FIGS. 14a and 14b. Specifically, the (B-D)–(A-C) voltage is proportional to the pure $\theta x$ component, whereas the –((A-C)+(B-D)) voltage is proportional to the pure $\theta y$ component. These pure $\theta x$ and $\theta y$ components are shown in FIGS. 15a and 15b respectively. In FIG. 15a, the (B-D)–(A-C) voltage increases linearly as the X axis rotation angle varies from a maximum negative angle to a maximum positive angle. Similarly, in FIG. 15b, the (A-C)+(B-D) voltage decreases linearly as the Y axis rotation angle varies from a maximum negative angle to a maximum positive angle.

Errors in detecting the pure $\theta x$ and $\theta y$ components due to cross coupling, dimensional tolerance, and misalignment may also be measured by observing the ((B-D)–(A-C)) and ((A-C)+(B-D)) output voltages. For example, errors in detecting the $\theta x$ component may be measured by observing (B-D)–(A-C) while rotating in the $\theta y$ direction and holding $\theta x$ constant. If the (B-D)–(A-C) voltage remains constant during this test, it is determined that no detection error is present. Similarly, errors in detecting the $\theta y$ component may be measured by observing the (A-C)+(B-D) output voltage while rotating in the $\theta x$ direction and holding $\theta y$ constant. If the (A-C)+(B-D) voltage remains constant during this test, then it is determined that no detection error is present.

The differential sensor mode described in this embodiment, effectively reduces the noise factor in detection by a factor of 1.4 since random noise is averaged. Also, the 45 degree angle positioning of sensors (A-D) effectively decouples $\theta x$ from $\theta y$ even though the sensors are not located directly on the X or Y axes. Other sensor locations may be alternatively chosen, however, a transformation matrix is developed to account for differing angular and radial position relative to the center of rotation.

Figure 16:
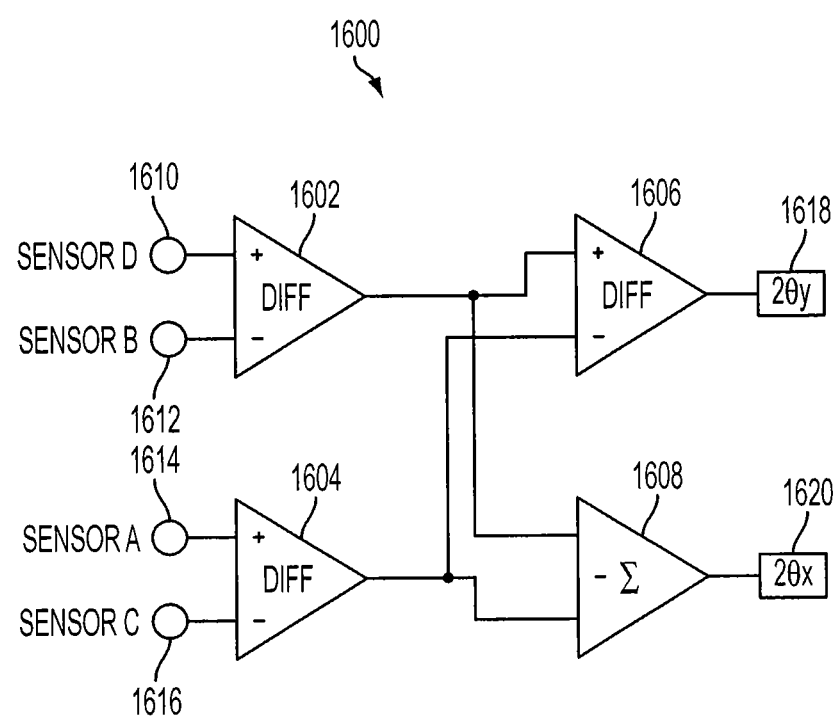
FIG. 16 is a schematic diagram of a circuit for computing the voltages depicted in FIGS. 14a, 14b, 15a and 15b.

Shown in FIG. 16 is a schematic diagram of detection circuit 1600. Circuit 1600 computes the output voltage values shown in FIGS. 15a and 15b which indicate the pure X and Y position of mirror 104. Output voltages 1610, 1612, 1614, and 1616 of sensors (A-D) are input to differential amplifiers 1602 and 1604 respectively. Amplifiers 1602 and 1604 compute the differences between the four sensor output voltages and then input the computed voltage differences to amplifiers 1606 and 1608 respectively. Utilizing the computed voltage differences, amplifiers 1606 and 1608 compute the pure $\theta x$ and $\theta y$ components of mirror 104.

In general, differential amplifier 1606 has a high input common mode rejection, and summing amplifier 1608 is an inverting summer combined with an inverting buffer. The configuration of circuit 1600 may alternatively be implemented in software by digitizing the differential input signals and then computing the sum and differences. Furthermore, sample averaging may also be used in both hardware and software configurations to reduce noise.

Figure 17:
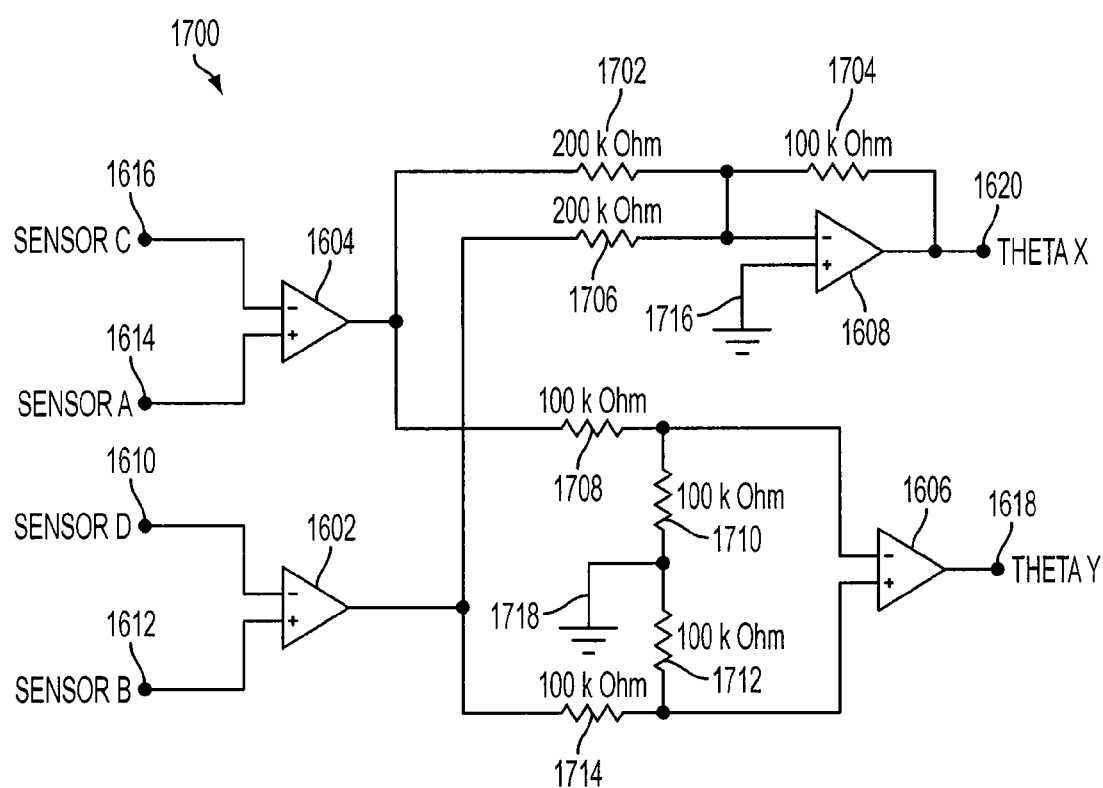
FIG. 17 is a detailed schematic diagram of the circuit shown in FIG. 16.

FIG. 17 is a schematic diagram of circuit 1700 which is a detailed view of detection circuit 1600. Resistors 1702, 1704, 1706, 1708, 1710, 1712 and 1714 are placed at the input terminals of amplifiers 1606 and 1608. The non inverting terminal of amplifier 1608 and the common connection point between resistors 1710 and 1712 are grounded by ground terminals 1716 and 1718 respectively. This configuration provides attenuation of the amplifier input signals by a factor of 2 which compensates for the rail voltages of the amplifiers (rail voltages may double the values of $\theta x$ and $\theta y$).

It should be noted that if an inverted output may be accommodated by the external processing electronics, the differential signals may be reversed at the input and the inverting buffer on the summer amplifier may be eliminated. Elimination of the inverting buffer may reduce noise, power consumption and physical space requirements of the circuit.

As will be described, the present invention also includes a system for protecting the mirror during acceleration and/or impact. A controllable locking mechanism in the system is employed for limiting the overall movement of the mirror during acceleration. The present invention also includes using the diaphragm as part of an electric circuit that drives the coils which tilt the mirror during operation.

Figure 18A:
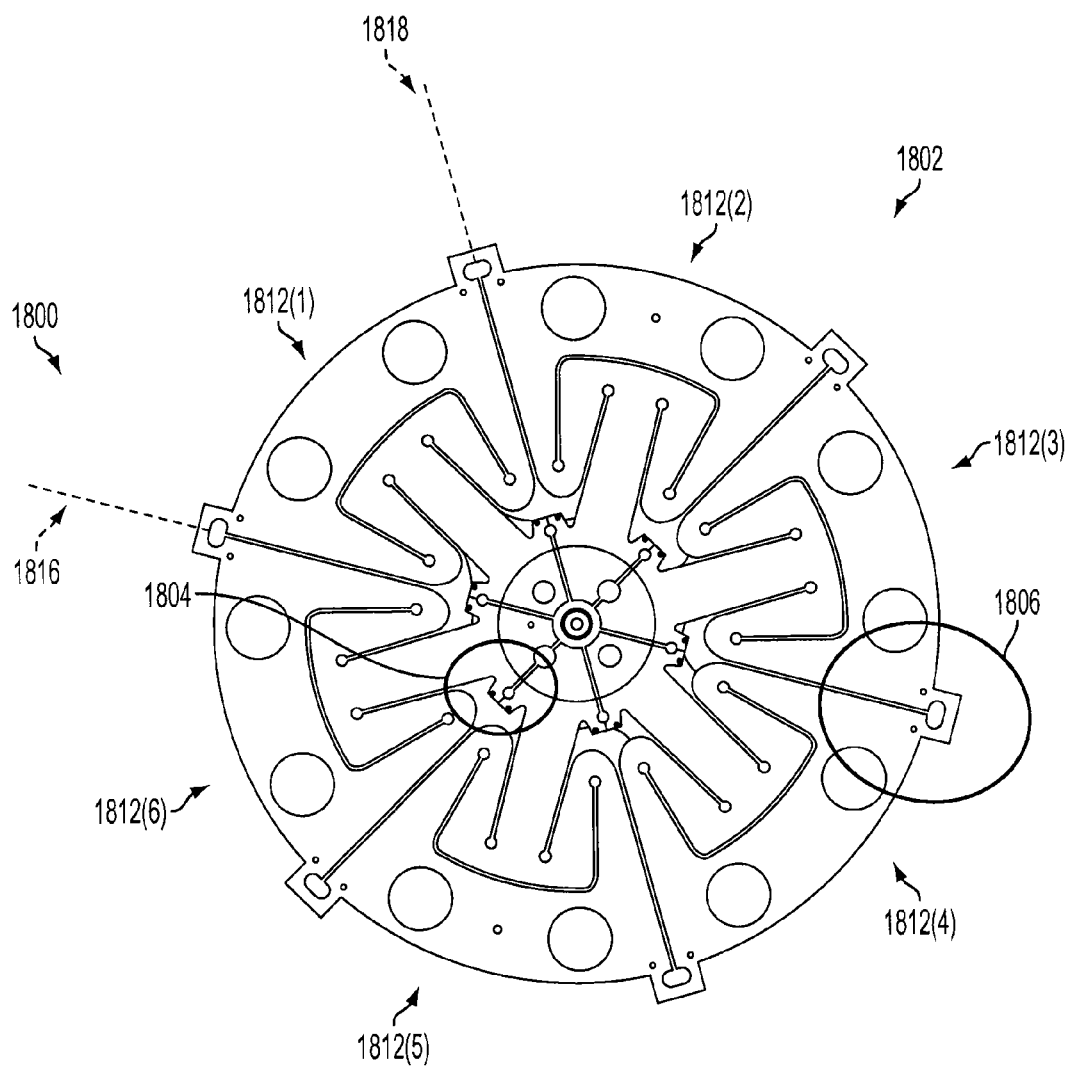
FIG. 18a is a top view of the diaphragm having six sectors connected to each other with installation tabs, according to an embodiment of the present invention.

As shown in FIG. 18a, an electrically conductive diaphragm 1800 (e.g. made of thinly cut metal) may include a plurality (e.g. six) of sectors 1812(1)-1812(6) which extend from the center point of the diaphragm to the outer circumference of the diaphragm. For example, sector 1812(1) is shown between axis 1816 and axis 1818 to extend from the center of the diaphragm in a shape similar to a triangle. Although six sectors are shown in FIG. 18a, it is noted that the diaphragm may be divided into two or more integer number of sectors.

Figure 18B:
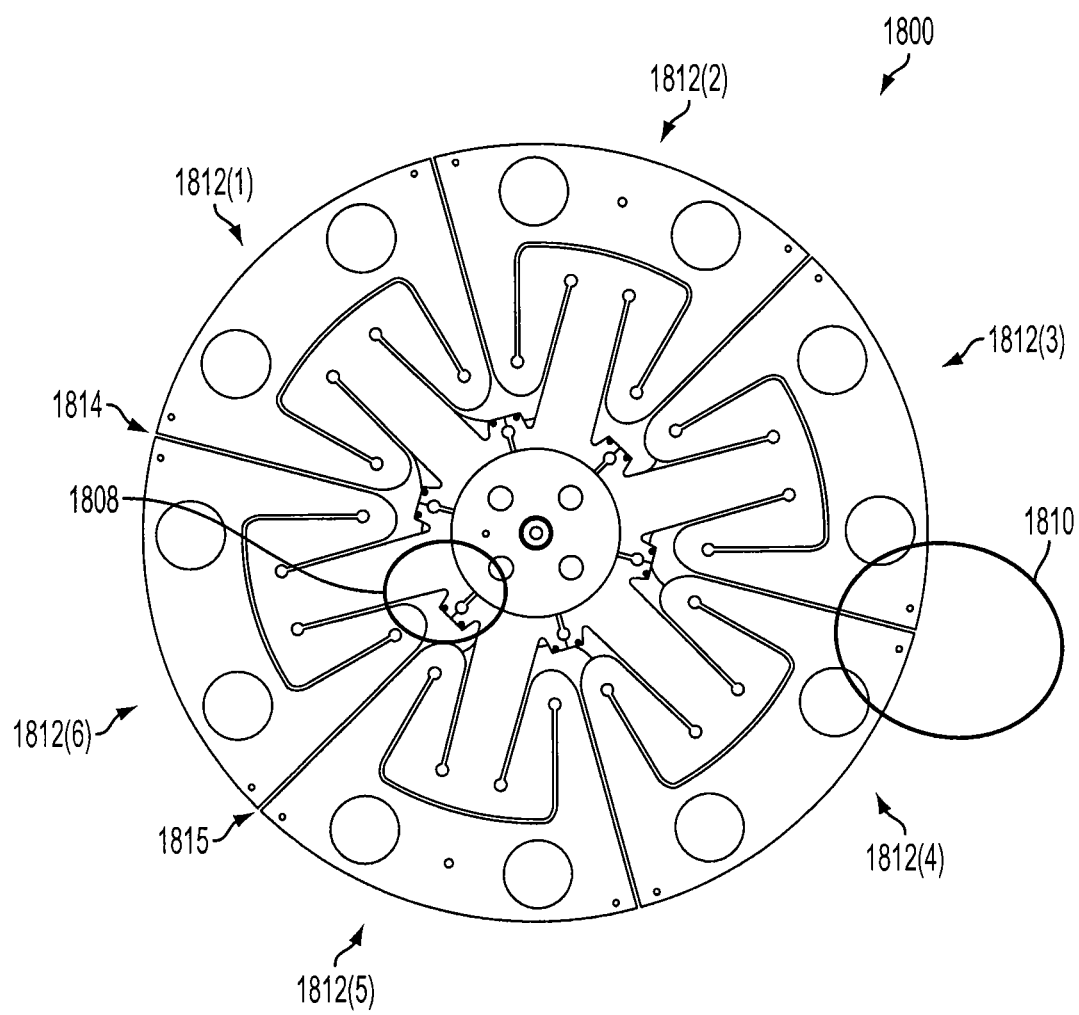
FIG. 18b is a top view of the diaphragm with the six sectors after the installation tabs have been removed resulting in six electrically isolated sectors, according to an embodiment of the present invention.

Each of the sectors are connected to adjacent sectors by inner diameter installation tabs 1804 and outer diameter installation tabs 1806. These tabs are disposed between the sectors and are left in place during the installation process (i.e., when the diaphragm is installed into the FSM). Once the diaphragm is installed into the FSM between the clamp rings, then the inner tabs 1804 and outer tabs 1806 are removed or cut. By removing these tabs, each of the respective sectors is electrically isolated from the other sectors. The result of the removed tabs (e.g., 1808 and 1810) is shown in FIG. 18b depicting six electrically isolated sectors are produced. Each sector has gaps (e.g., 1814 and 1815) that extend from the center of the diaphragm to the outer circumference of the diaphragm. These air gaps electrically isolate each sector from the adjacent sectors. It is noted that the sectors are also electrically isolated from other conductive components of the FSM, such as the clamp rings by utilizing insulating rings and insulating disks (described with respect to FIG. 19b).

In general, by electrically isolating each sector from the adjacent sectors, each sector may be utilized as a conductor for conducting electrical current (e.g. from the external power supply to the coils on the drive plate). For example, current may flow from the outer circumference of a particular sector towards the central portion of the diaphragm connected (e.g. via a wire) the coils below the drive plate.

Figure 19A:
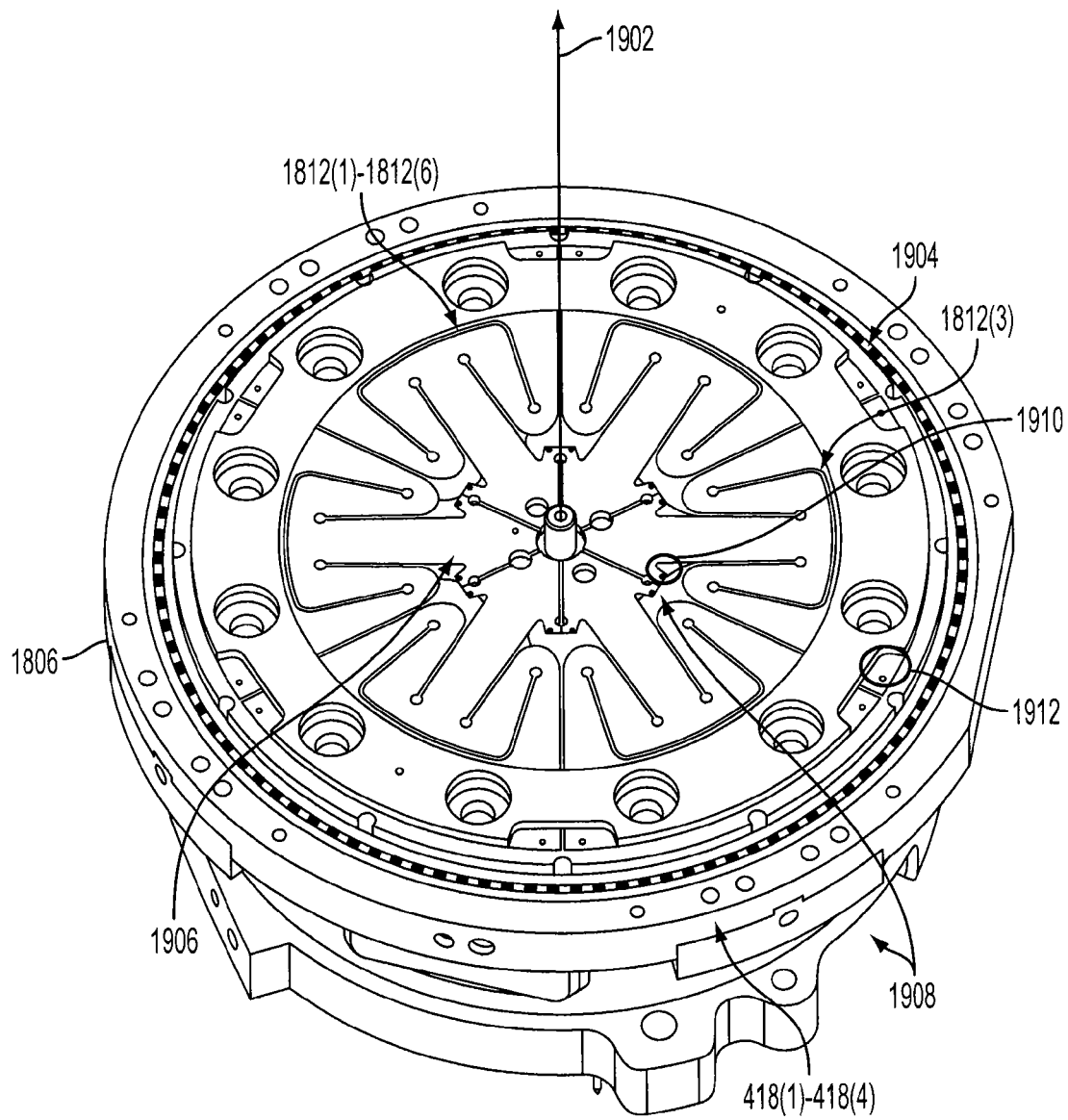
FIG. 19a is a top view (without the mirror) where the diaphragm is mounted in the FSM housing, according to an embodiment of the present invention.

As shown in FIG. 19a, the flexible diaphragm is mounted inside the FSM. As shown in FIG. 19a, assembly tabs 1806 are cut or removed, and mirror attachment 1906 and center assembly axis 1902 are located in the center portion of the diaphragm. Coils 418(1)-418(4) are also located below the diaphragm (not shown). Insulating clamp rings 1904 are utilized on the top and bottom portion of the outer diameter of the diaphragm to electrically isolate the diaphragm from the top and bottom clamp rings.

Each sector may also include an inner diameter electrical contact 1910 and an outer diameter electrical contact 1912. As will be described, the inner diameter electrical contact 1910 may be electrically coupled to the coils below the drive plate, whereas the outer diameter electrical contact 1912 may be coupled to a controller providing electrical current to the coils. In general, the electrical current may be inputted through electrical contact 1912. The electrical current flows through the electrically conductive sector (e.g. 1812(3)) to the inner electrical contact 1910. The inner electrical contact 1910 delivers the electrical current through a wire (not shown) below the diaphragm to the coils.

Figure 19B:
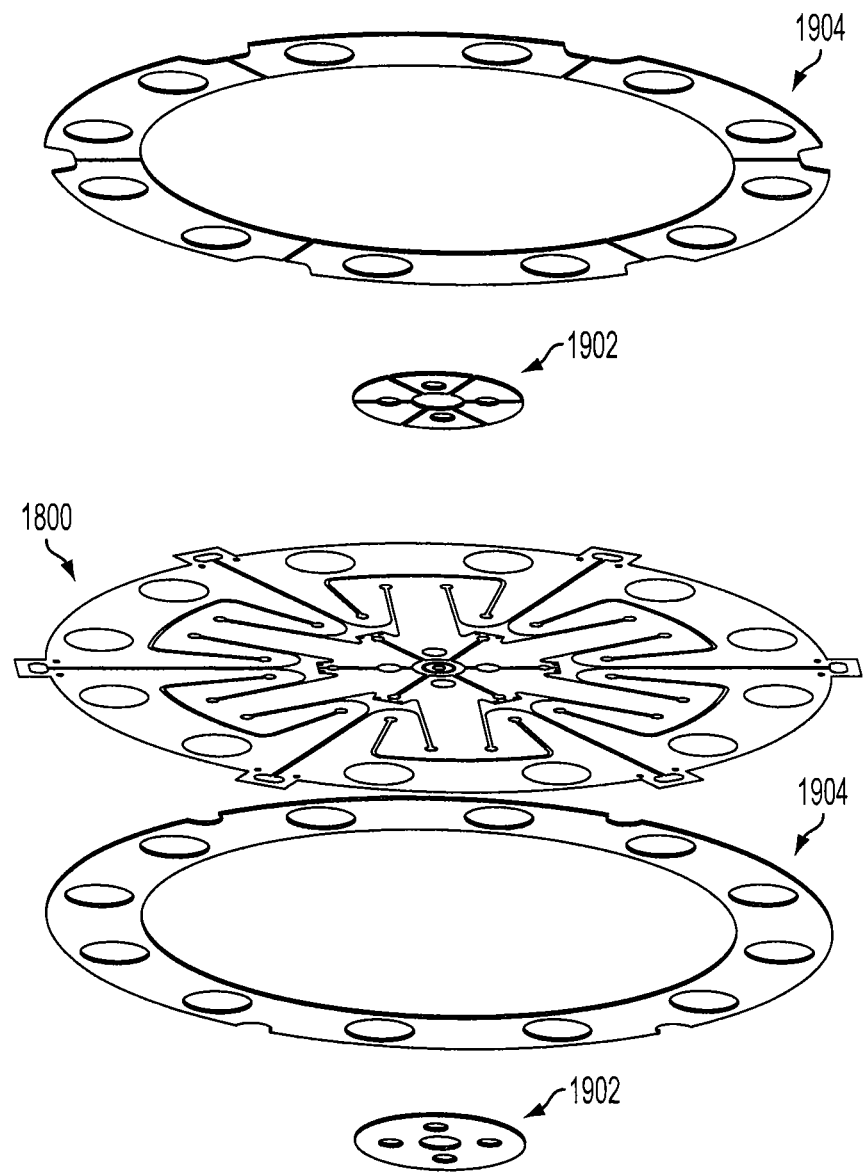
FIG. 19b is an exploded view of the diaphragm sandwiched between electrically insulating rings and disks, according to an embodiment of the present invention.

As shown in FIG. 19b, diaphragm 1800 is sandwiched between insulating rings 1904 and insulating disks 1902. Insulating rings 1904 may electrically isolate diaphragm 1800 from conductive metal components of the FSM such as the top clamp ring and the bottom clamp ring holding the diaphragm in place. Disks 1902 may also electrically isolate the inner portion of diaphragm 1800 from mirror spacer plate 406 and mirror flexure mount plant 412. In general, isolating rings and disks are utilized to electrically isolate the conductive diaphragm sectors from other metal components, not including the electrical contacts to the coils and the controller.

Figure 20A:
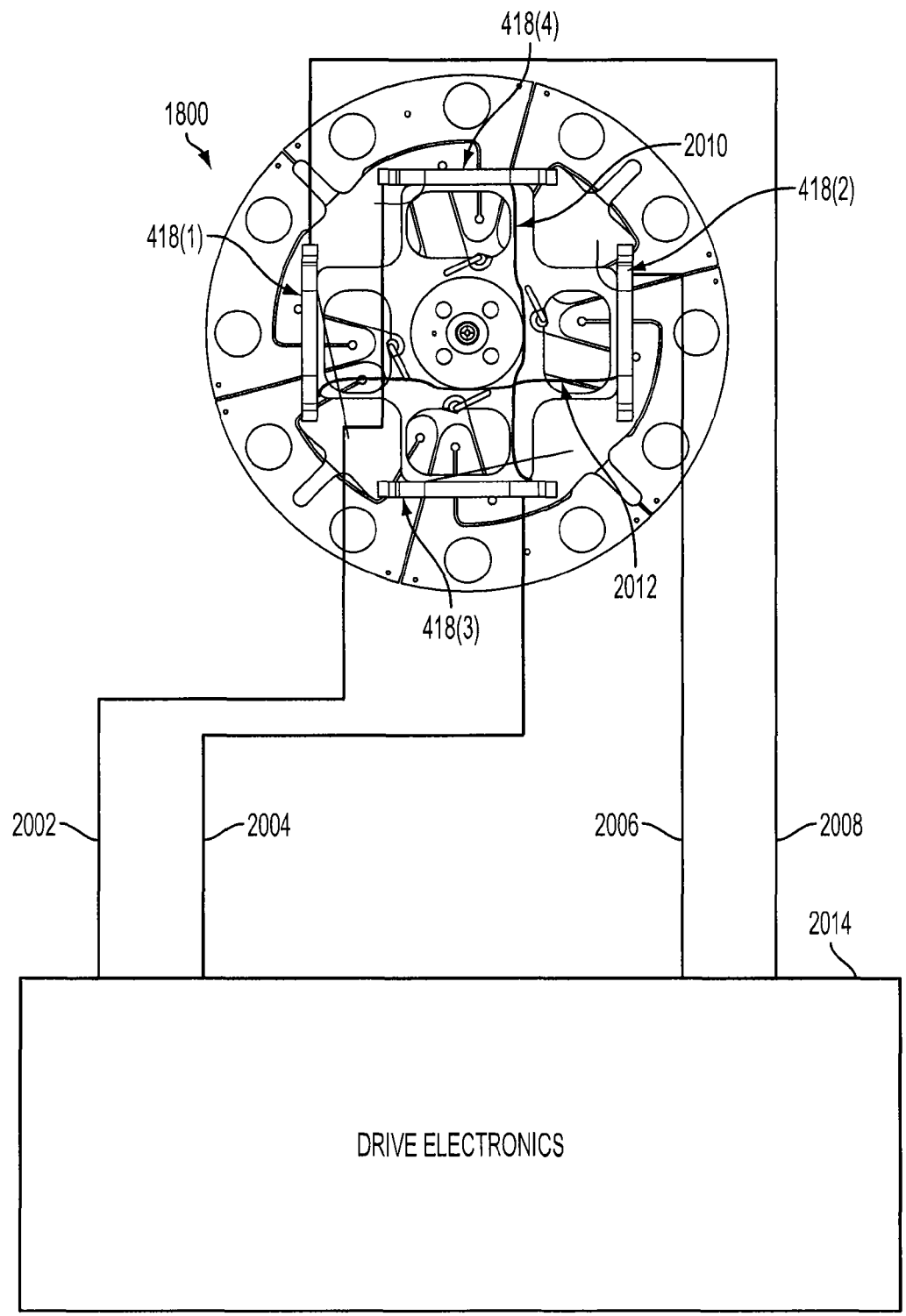
FIG. 20a is a wiring diagram where the coils of the drive plate are wired in series, according to an embodiment of the present invention.

FIG. 20a shows a wiring pattern for the coils located below diaphragm 1800. Specifically, the four coils may be divided into two pairs of opposite coils, each wired in series with the other. For example, coils 418(1) and 418(2) may be wired in series with the other with respect to drive electronics 2014. Similarly, coils 418(3) and 418(4) may be wired in series with respect to drive electronics 2014. This may be accomplished by utilizing four wires 2002, 2004, 2006 and 2008 extending from drive electronics 2014. Two wires are also utilized below the drive plate to connect the respective pairs in series (i.e., wires 2010 and 2012). This allows for current to pass through both coils simultaneously. Since the coil polarities are opposite, then each pair of coils performs the push/pull motion as described above.

For example, as current flows through coil 418(1), the coil may pull down on the drive plate. This current may flow in the opposite direction through coil 418(2), thus, causing coil 418(2) to push up on the drive plate. Similar operations are performed by coils 418(3) and 418(4).

Figure 20B:
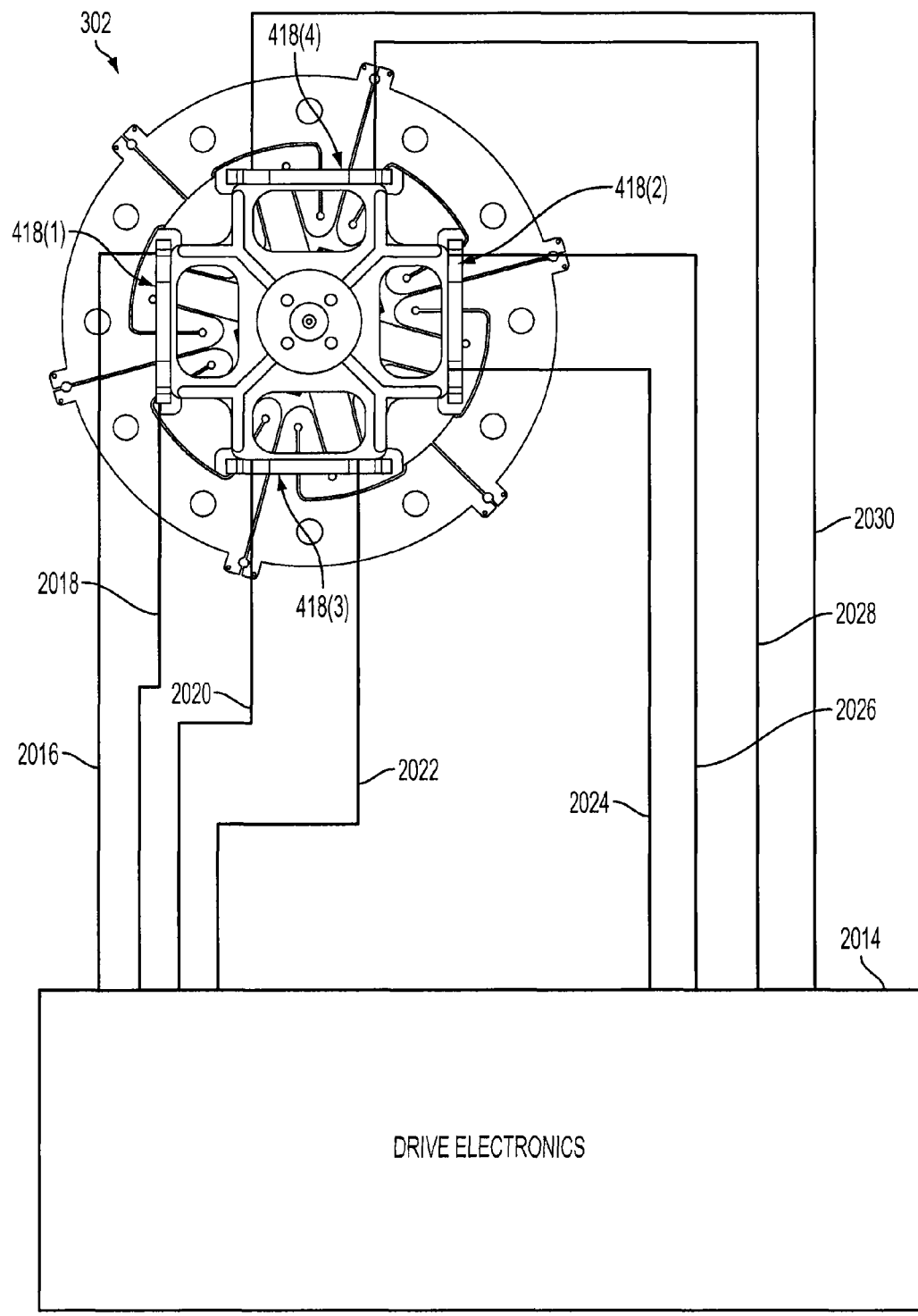
FIG. 20b is a wiring diagram where the coils are individually wired in parallel, according to an embodiment of the present invention.

In another embodiment shown in FIG. 20b, each of the coils may be wired separately in parallel. Drive electronics may control each coil individually by utilizing eight separate wires 2016, 2018, 2020, 2022, 2024, 2026, 2028 and 2030. In this configuration, there may be eight sectors that are cut out from the diaphragm to conduct current in the eight wires.

Figure 21A:
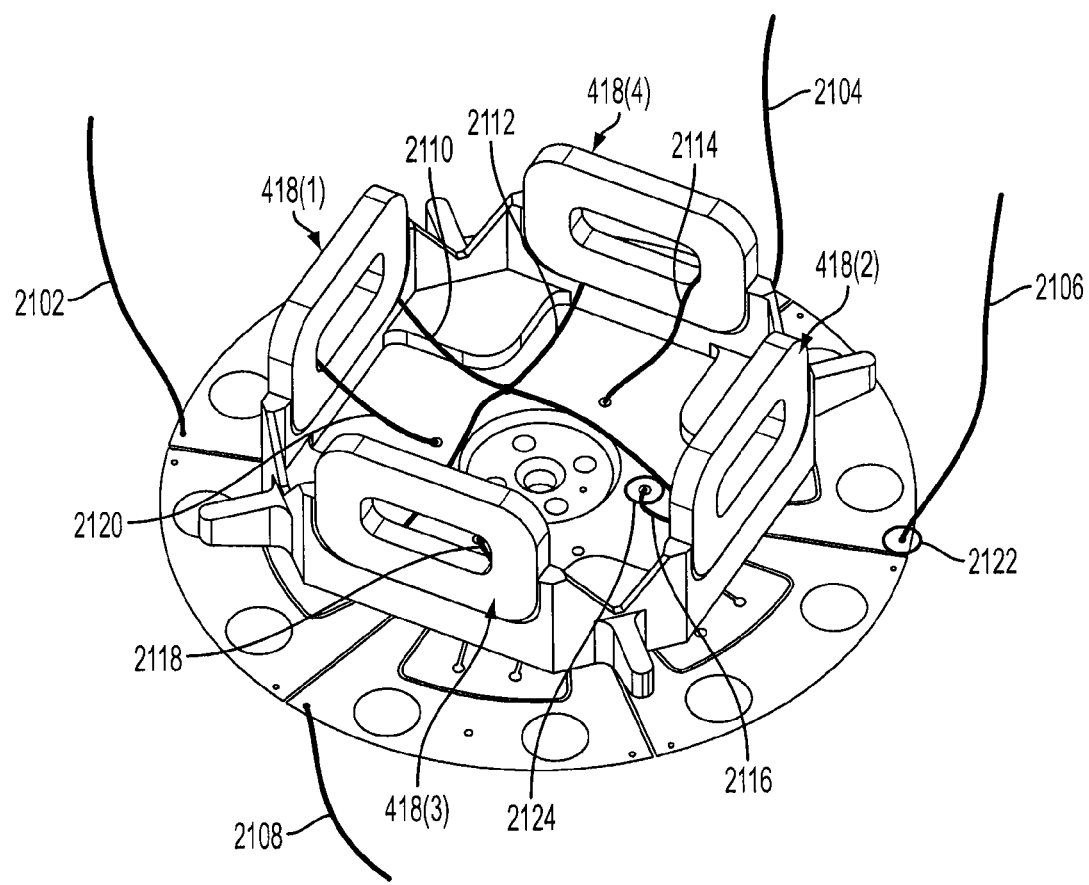
FIG. 21a is a view of the wiring connections from the diagram of FIG. 20a, according to an embodiment of the present invention.

FIG. 21a shows a more detailed view of the wiring pattern with respect to connections to the sectors and coils. For example, sector 418(1) may include an electrical connection from its outer diameter at 2102, which conducts current through the sector to the inner diameter contact connected to wire 2120. The electrical current may flow through coil 418(1), through wire 2110, through coil 418(2) and then back to the inner electrical contact 2124, via wire 2116. The current may then flow through the respective sector to the outer diameter electrical contact 2122 and through wire 2106.

A similar pathway for the current may sequentially flow from wire 2108 to the outer diameter of a respective sector, through the sector to the inner diameter electrical contact of the sector, through wire 2118, through coil 418(3), through wire 2112, through coil 418(4), through wire 2114, through the inner diameter electrical contact of the sector, through the sector to the outer diameter electrical contact of the sector, and through wire 2104.

Figure 21B:
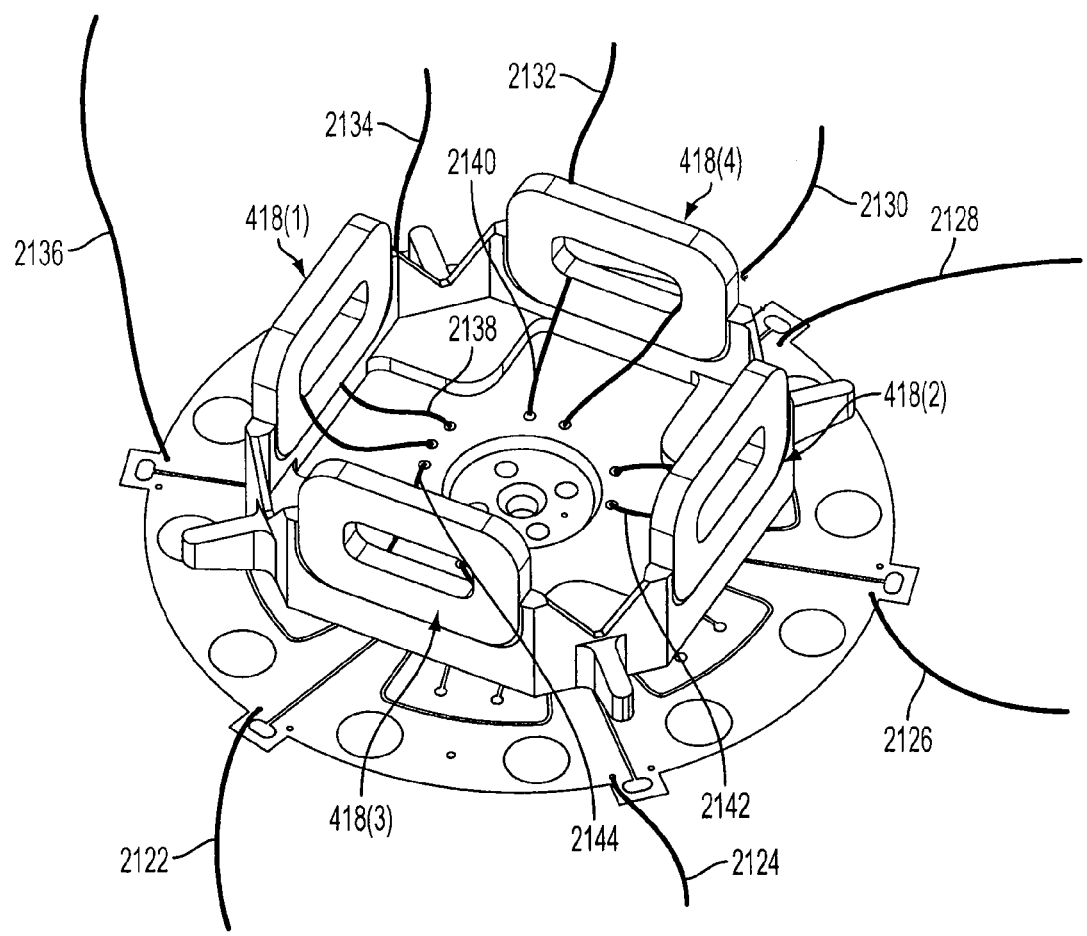
FIG. 21b is a view of the wiring connections from the diagram of FIG. 20b, according to an embodiment of the present invention.

The configuration shown in FIG. 21b is a parallel connection. Current may be conducted from the outer diameter of the flexure, through each sector, into the inner diameter of the sector, and through the coils in parallel rather than in series. This configuration allows for independent control of each of the four coils.

For example, the diaphragm may be divided into eight sectors, each of which are connected to the eight wires 2122-2136, respectively. The coils may include respective wire pairs 2138-2144 that are connected to the inner diameter contacts of the sectors (i.e. eight coil wires connected to the respective eight sectors, resulting in eight electrical paths). This configuration allows the controller to independently provide current to each of the coils through eight sectors.

In general, in FIGS. 21a and 21b, the current may be passed through any number of sectors to the coils without having wires coupled between the moving coils and a stationary object such as the FSM housing. Since wires are not connected to the coils and to a stationary object (i.e., the moving coils are not wired directly to stationary wires 2102, 2104, 2106 and 2108 as shown in FIG. 21a), hysteresis is not introduced when the mirror is in operation. This configuration allows the mirror to tilt in two different axes, without constraints of wires connecting stationary portions of the FSM to moving portions of the FSM (i.e. conductive sectors electrically bridge the movable electrical components and stationary electrical components).

As described above, a locking mechanism may also be employed to provide integrity to the mirror when movement is not desirable (e.g., during launch of the mirror into space).

Figure 22A:
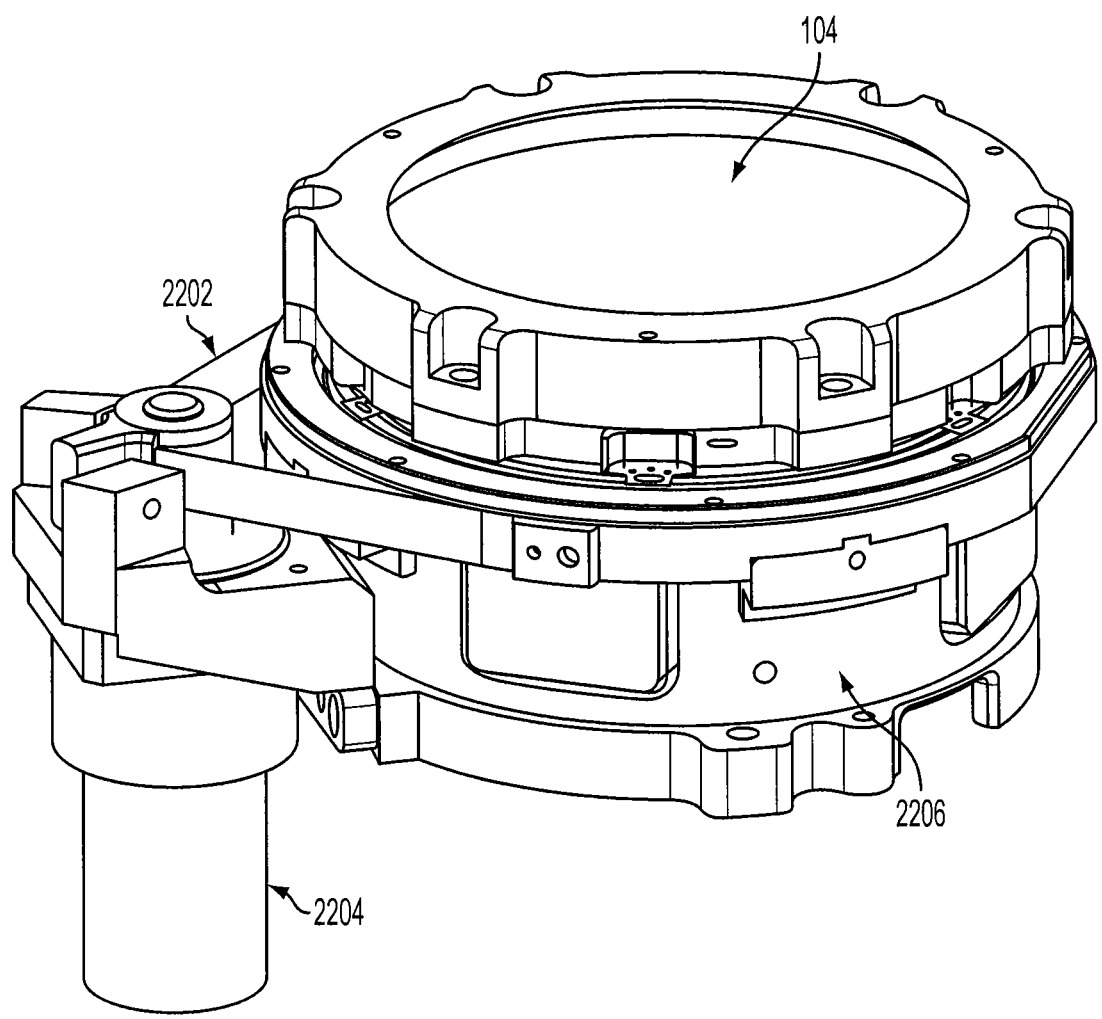
FIG. 22a is a view of the FSM assembled with a lock ring, a tension belt and a lock drive motor, according to an embodiment of the present invention.

As shown in FIG. 22a, the FSM may include a tension drive belt 2202 that turns a locking ring (not shown), a lock drive motor 2204 that drives the tension belt, and a housing 2206.

Figure 22B:
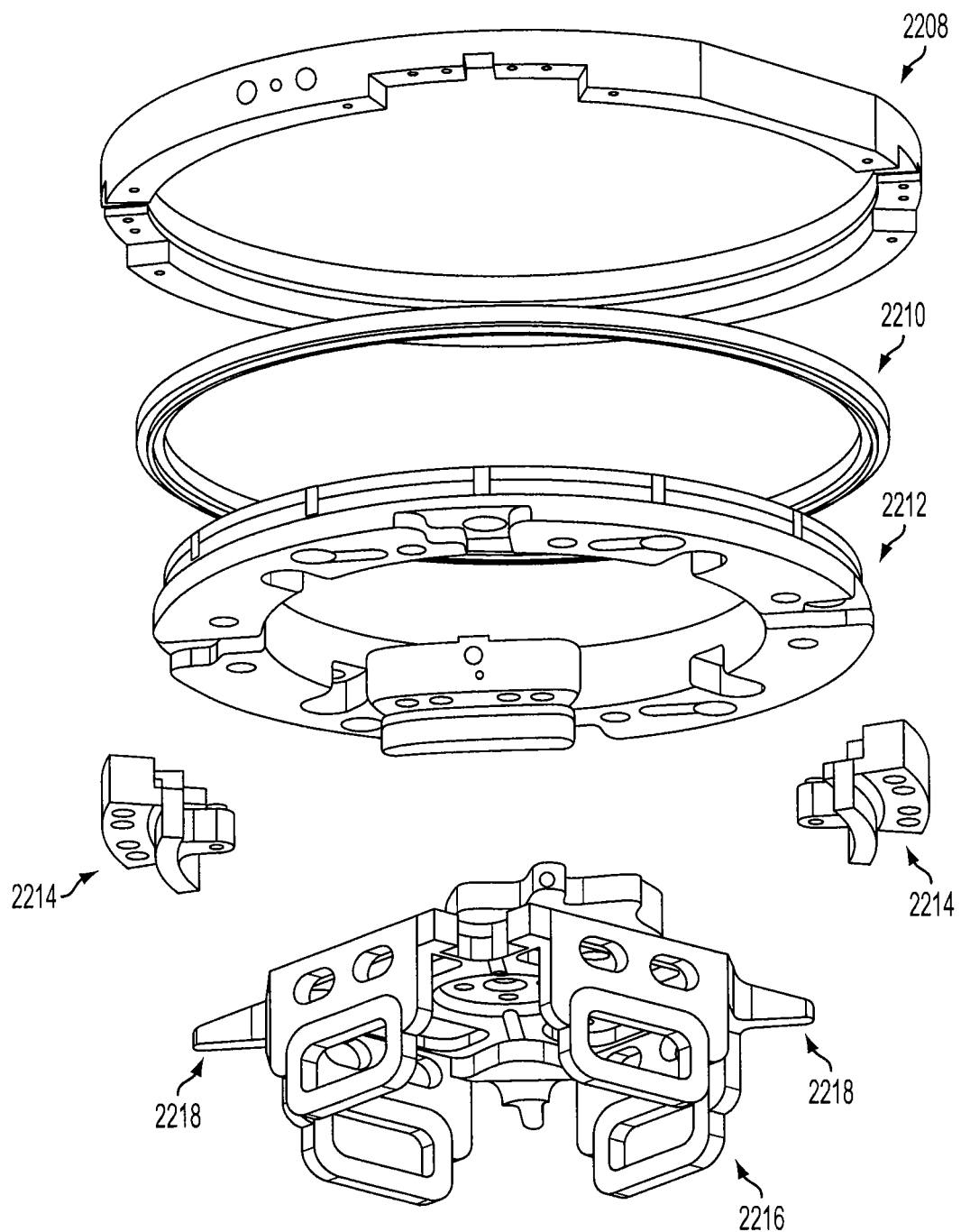
FIG. 22b is an exploded view of the lock ring and its orientation with respect the drive plate, according to an embodiment of the present invention.

FIG. 22b is an expanded view of the locking mechanism showing a lock ring assembly 2208, a lock ring 2210, an outer bottom clamp ring 2212, a limit assembly 2214 and a drive plate 2216 including tabs 2218.

As will be described, the ring assembly includes limits that may in a locked position limiting the motion of tabs 2218, or in an unlocked position not limiting the motion of tabs 2218.

Figure 23:
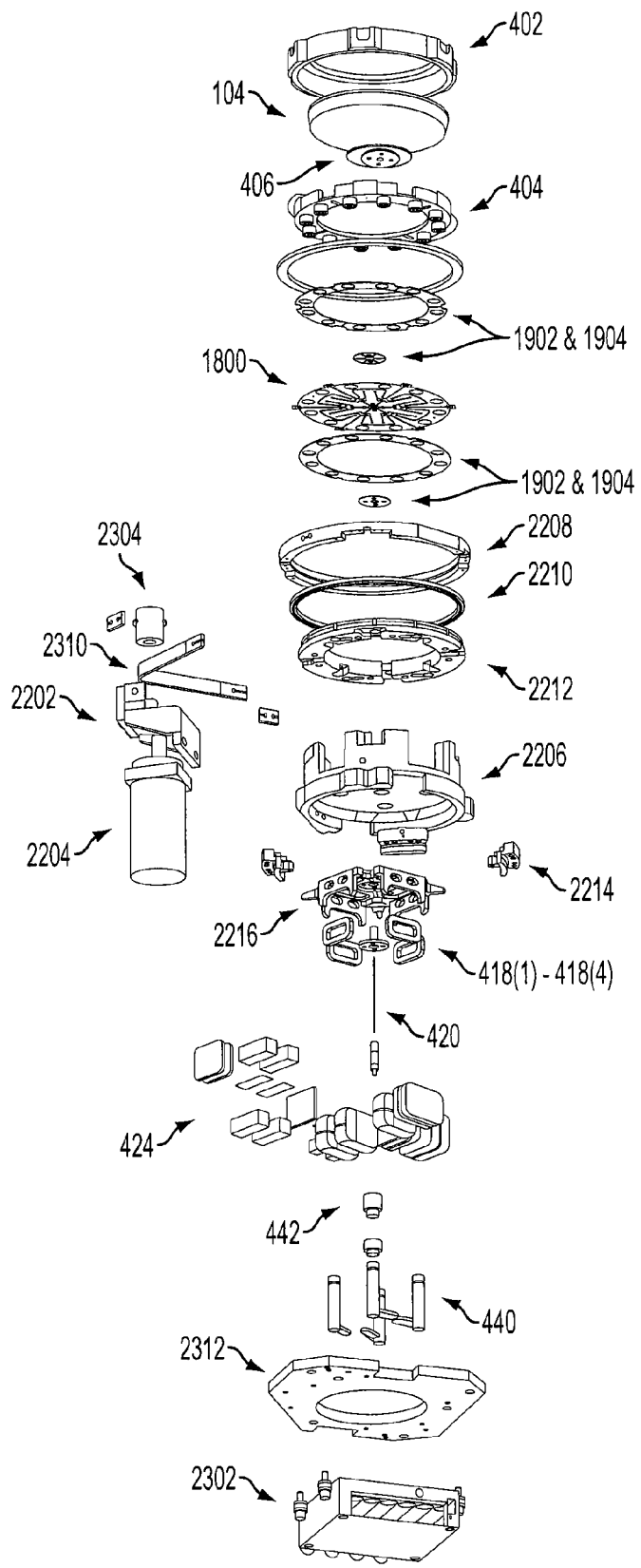
FIG. 23 is an exploded view of the FSM system which includes the lock ring, the tension belt drive, the drive motor, the diaphragm with insulated sectors and the insulating rings, according to an embodiment of the present invention.

FIG. 23 shows another exploded view of the FSM system including diaphragm flexure 1800, electrical isolation rings 1902 and 1904, drive shaft 2204, tension belt drive 2202, drive motor 2204, housing 2206, lock ring assembly 2208, lock ring bearing 2210, outer bottom clamp ring 2212, drive plate with limit tabs 2216 and FSM electronics 2302 (i.e., the controller operating the drive motor and coils). The operation of the lock ring and drive motor is described below.

Figure 24A:
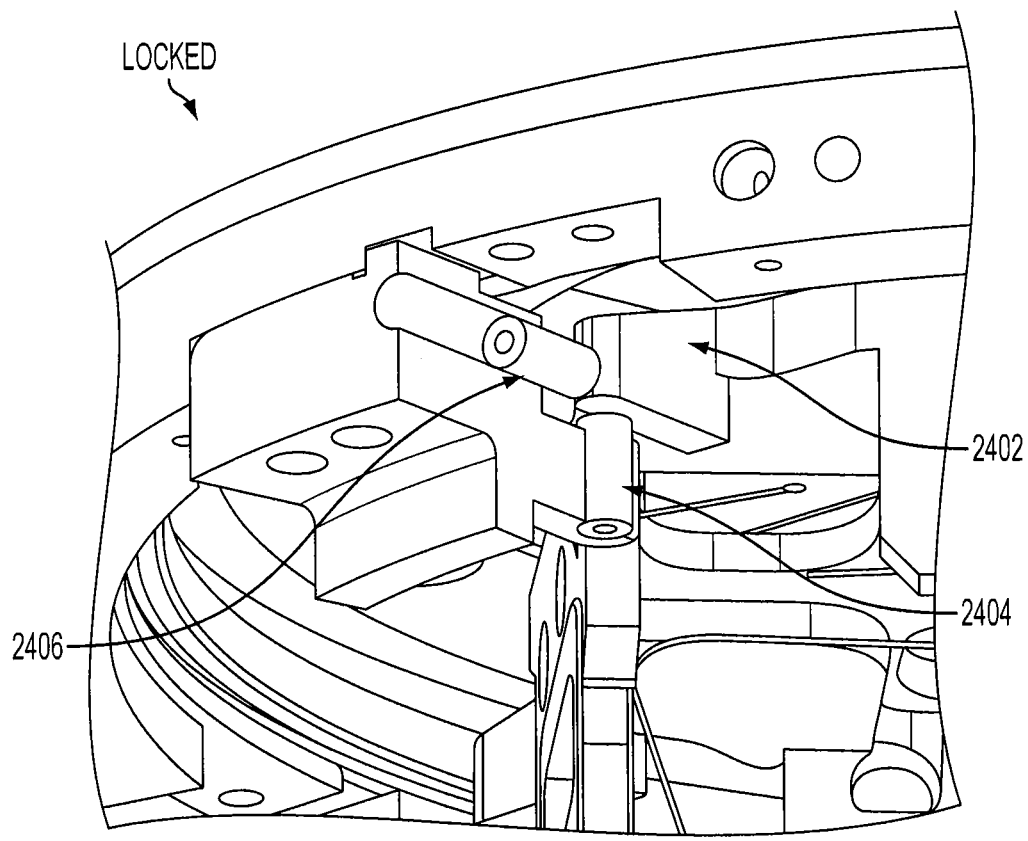
FIG. 24a is a side view of the locked position of the limits with respect to the tab on the drive plate, according to an embodiment of the present invention.
Figure 24B:
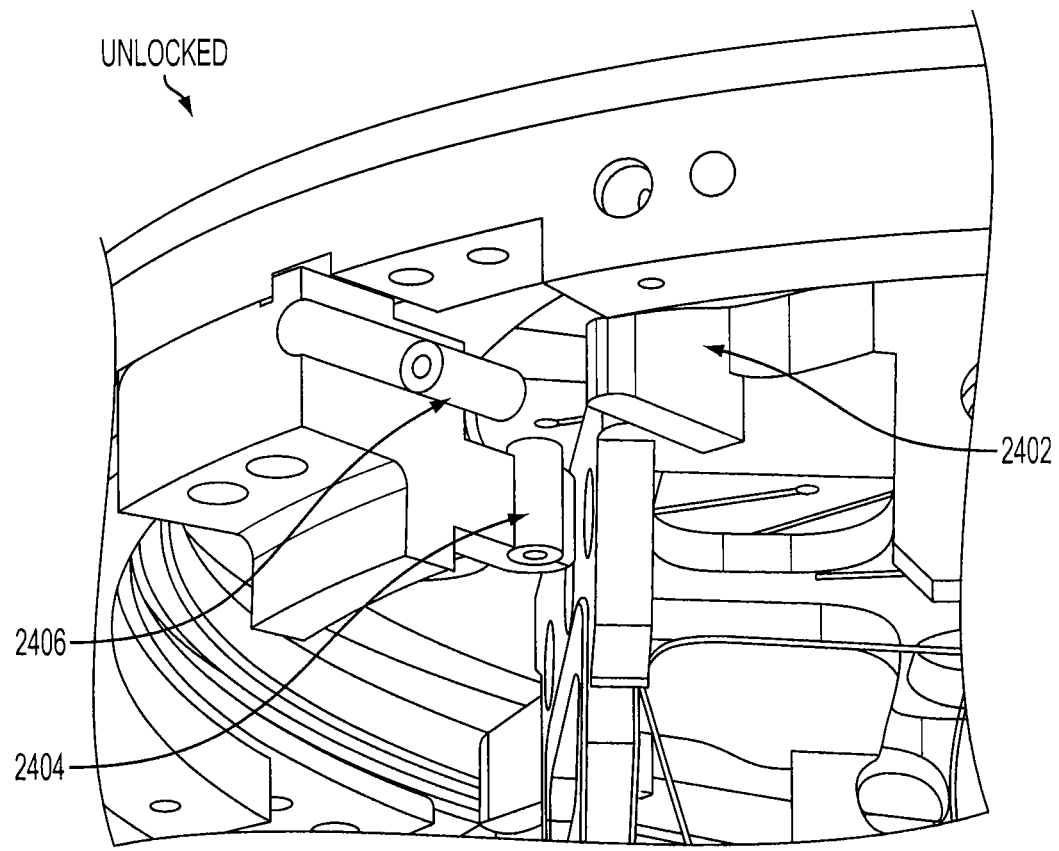
FIG. 24b is a side view of the unlocked position of the limits with respect to the tab on the drive plate, according to an embodiment of the present invention.

As shown in FIG. 24a, the lock ring includes a vertical limit 2404 and a lateral limit 2406. The vertical and lateral limits may be manufactured from soft material, such as plastic that may absorb shock from tab 2402 without causing damage to the FSM. In the locked position, the lateral limit 2406 and vertical limit 2404 may be rotated on the lock ring so that they overlap tab 2402. In general, the limits may be positioned in close proximity to the tabs (e.g., <0.010 inches).

If the drive plate moves in a lateral or vertical direction, the tab 2402 (which is part of the drive plate) also moves. This movement causes tab 2402 to contact either one or both of the vertical and lateral limits. Since the vertical and lateral limits are stationary, they restrict movement of tab 2402 and, therefore, restrict the movement of the drive plate and mirror. This locked position is beneficial during shipping of the FSM or launching the FSM into space where the FSM experiences acceleration that may damage the mirror.

When the FSM is in normal operation, the lock ring may be rotated by the motor to an unlocked position. Specifically, the vertical and lateral limits 2404 and 2406 are rotated away from tabs 2402 so that the drive plate may move freely without the tabs contacting the limits (i.e. the tabs are not restricted by the limits, the latter being positioned away from the tab).

The FSM system is thus able to control whether the mirror is in a locked position or an unlocked position. The mirror may be in a locked position during launch of a space vehicle. Once the FSM is in space, the system may move to an unlocked position so that the mirror can perform normal steering operations. Controlling the position of the limits may be preprogrammed into the controller, or may be remotely controlled in real-time by an operator.

Figure 25A:
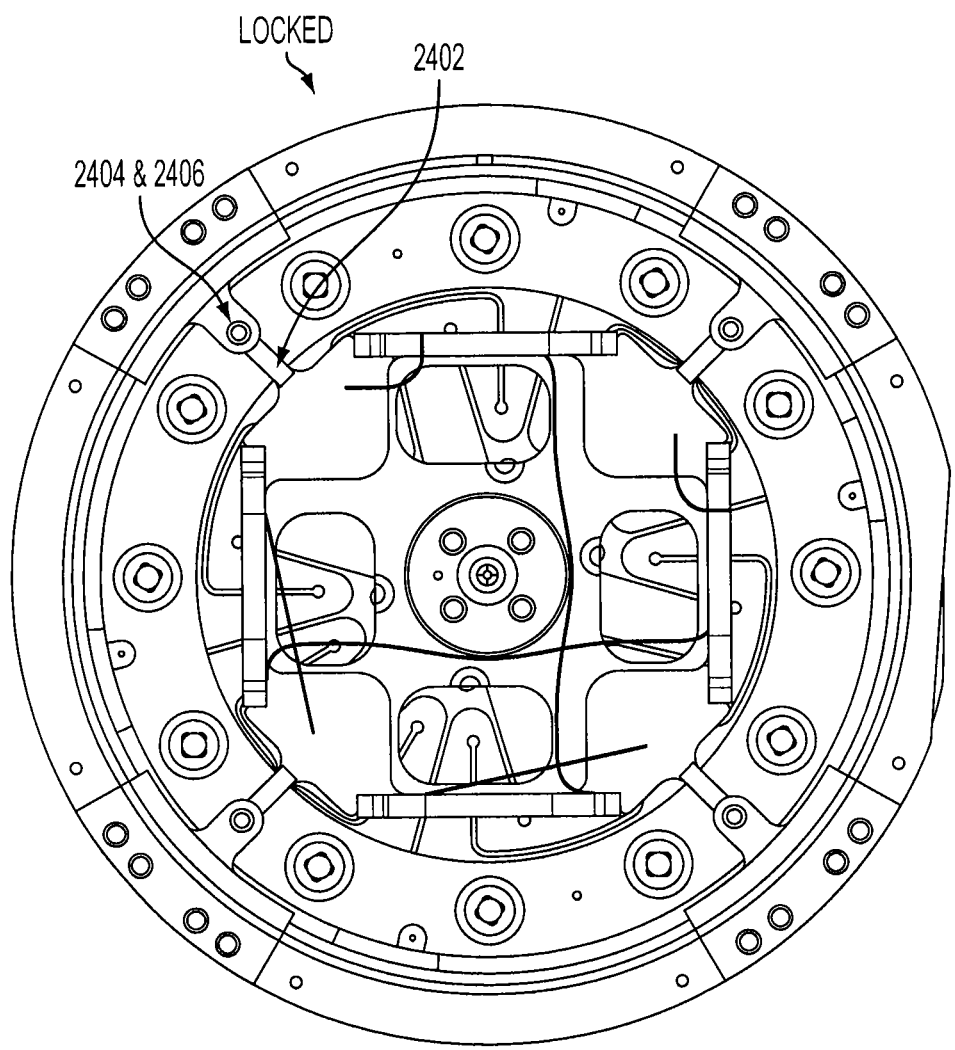
FIG. 25*a* is a view of the bottom of the FSM system where the limits and the tabs on the drive plate are in the locked position, according to an embodiment of the present invention.

A bottom view of the FSM in the locked position is shown in FIG. 25a. In this example, the vertical and lateral limits 2404 and 2406 overlap tabs 2402. In this embodiment, there are four sets of vertical and lateral limits and four respective tabs overlapping each other. Although four pairs of limits and four tabs are shown in this embodiment, any integer number may be employed to lock the mirror in place.

Figure 25B:
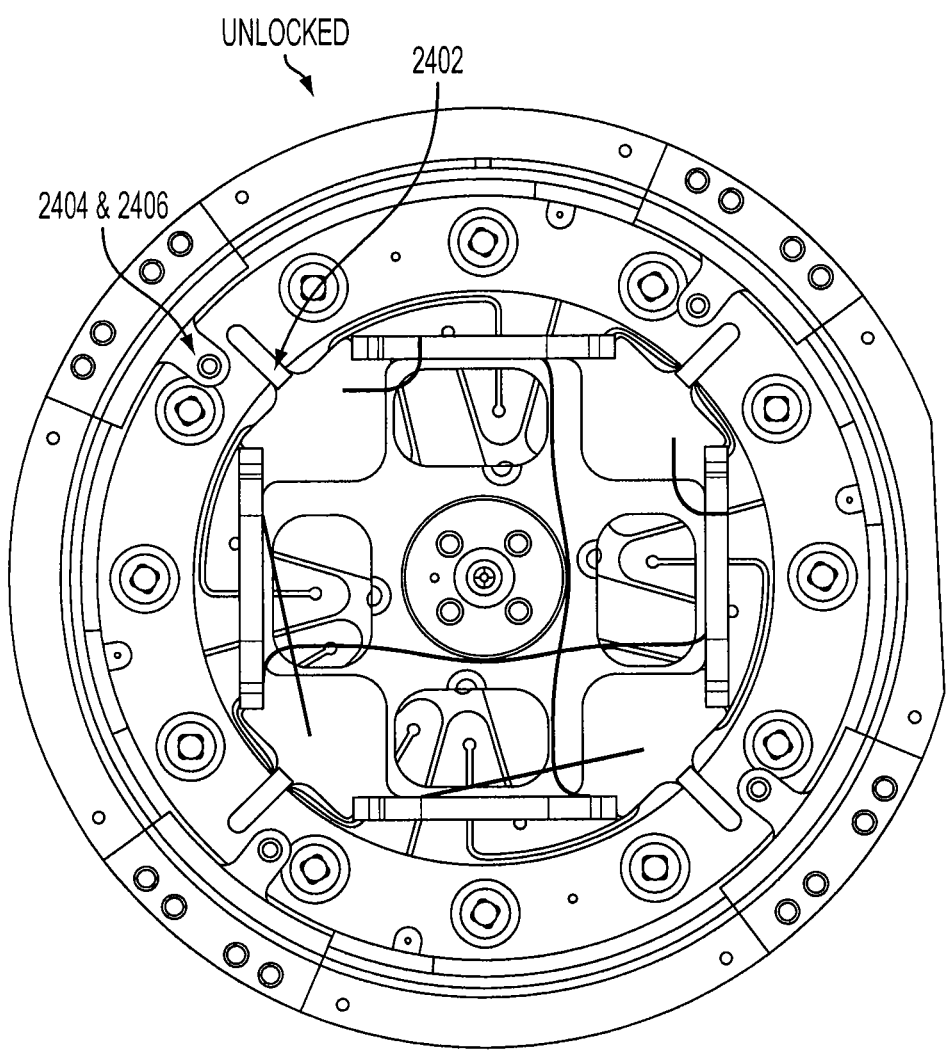
FIG. 25*b* is a view of the bottom of the FSM system where the limits and the tabs on the drive plate are in the unlocked position, according to an embodiment of the present invention.

In the unlocked position, as shown in FIG. 25b, the lock ring is rotated. As shown, vertical and lateral limits 2404 and 2406 are rotated away from tabs 2402 (i.e., the four tabs are rotated away from the limits so that the drive plate can move freely during normal operation).

Figure 26:
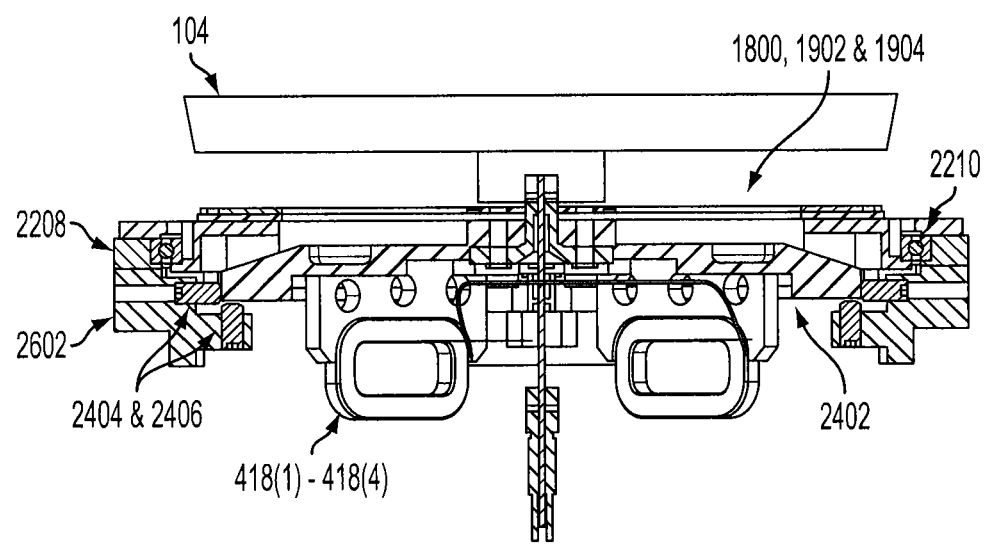
FIG. 26 is a simplified side view of the limits with respect to the tabs on the drive plate, according to an embodiment of the present invention.

FIG. 26 shows a simplified side view of the FSM in which the lock ring includes a stop support 2602 for supporting the limits. The positions of the vertical and lateral limits 2404 and 2406 may be adjusted during fabrication in the factory. For example, the vertical limits may be adjusted (e.g. screwed) to be within a certain distance to the lock tabs, whereas the lateral limits may adjusted to be within a different distance proximate to the lock tabs. These distances between the vertical and lateral limits and the tabs may be adjusted to allow a limited amount of movement by the drive plate during the locked position.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An apparatus for tilting a mirror comprising:
   a mirror for reflecting light from an object;
   a plate for supporting the mirror;
   a plurality of coils for providing tilt motion to the plate and mirror in response to current from a controller; and
   an electrically conductive diaphragm sandwiched between the mirror and the plate for stabilizing the tilt motion of the mirror,
   wherein the current from the controller flows through the diaphragm to the coils, and
   installation tabs are located in between a plurality of electrically isolated sectors of the diaphragm, the tabs holding each of the plurality of sectors together, the installation tabs being removed after the diaphragm is sandwiched between the mirror and the plate.

2. The apparatus of claim 1, including
   a plurality of sectors of the diaphragm that are electrically isolated from each other, the controller and the coils are electrically coupled to each other through at least four of the plurality of sectors, the current flowing through the at least four of the plurality of sectors; and
   electrical contacts on an inner diameter and an outer diameter of the at least four sectors, the respective inner diameter electrical contacts of the at least four sectors coupled to at least one coil, the respective outer diameter electrical contacts of the at least four sectors coupled to the controller.

3. The apparatus of claim 1, including
   clamp rings for mounting the electrically conductive diaphragm between the drive plate and the mirror; and
   insulating rings for electrically isolating the electrically conductive diaphragm from the clamp rings.

4. The apparatus of claim 1, including
   a serpentine pattern cutout of the electrically conductive diaphragm such that each sector has an electrically conductive path from an outer diameter of each sector to an inner diameter of each sector.

5. The apparatus of claim 1,
   wherein the installation tabs are located at an inner diameter and an outer diameter of the sectors.

6. The apparatus of claim 2
   wherein two sectors complete an electrical circuit between two series wired coils and two power terminals of the controller, the current provided by the controller flowing from the outer diameter of the sectors to the inner diameter of the sectors and through the coils.

7. An apparatus for tilting a mirror comprising:
a mirror for reflecting light from an object;
a plate for supporting the mirror;
a plurality of coils for providing tilt motion to the plate and the mirror in response to current from a controller; and
an electrically conductive diaphragm sandwiched between the mirror and the plate for stabilizing the tilt motion of the mirror, the electrically conductive diaphragm including a plurality of electrically isolated sectors,
wherein the current from the controller flows through the plurality of sectors to the coils, and
installation tabs are located between the sectors at an inner diameter and an outer diameter for holding the sectors to ether during installation, the tabs being cut after the diaphragm is installed into the apparatus.

8. The apparatus of claim 7, including
outer diameter electrical terminals on each of four sectors of the plurality of sectors electrically coupled to the controller; and
inner diameter electrical terminals on each of the four sectors electrically coupled to at least one of the coils,
wherein the inner diameter electrical terminals and the outer diameter electrical terminals are electrically coupled to each other through each of the four respective sectors, and
wherein the current flows from the controller to the outer diameter electrical contact, through a respective sector to the inner diameter electrical contact, and through the at least one coil.

9. The apparatus of claim 7, including
a first pair of coils being mounted to two opposite sides of the drive plate and wired in series with each other; and
a second pair of coils being mounted to two other opposite sides of the drive plate and wired in series with each other,
wherein the first pair of coils are coupled to two inner diameter electrical contacts of a first pair of sectors, the second pair of coils are coupled to two inner diameter electrical contacts of a second pair of sectors, and the controller is coupled to the outer diameter electrical contacts of the first pair of sectors and the second pair of sectors.

10. The apparatus of claim 7, including
eight sectors of the electrically conductive diaphragm; and
four coils being mounted to four opposite sides of the drive plate,
wherein each of the four coils is electrically coupled to inner diameter electrical contacts of two respective sectors, and the controller is electrically coupled to outer diameter electrical contacts of the eight sectors.

11. The apparatus of claim 7, including
insulating rings electrically isolating the electrically conductive diaphragm from clamp rings that mount the diaphragm in the apparatus.

12. The apparatus of claim 7, including
insulating disks electrically isolating the electrically conductive diaphragm from mirror support and the drive plate.

13. An apparatus for tilting a mirror comprising:
a mirror for reflecting light from an object;
a plate for supporting the mirror;
a plurality of coils for providing tilt motion to the plate and mirror in response to current from a controller; and
an electrically conductive diaphragm sandwiched between the mirror and the plate for stabilizing the tilt motion of the mirror,
wherein the current from the controller flows through the diaphragm to the coils, and
the diaphragm flexes to stabilize the tilt motion of the mirror, in response to the current flowing through the diaphragm, and
flexure of the diaphragm is a movement that is separate from the tilt motion to the plate and mirror.

14. The apparatus of claim 13, including
installation tabs located in between a plurality of electrically isolated sectors of the diaphragm, the tabs holding each of the plurality of sectors together, the installation tabs being removed after the diaphragm is sandwiched between the mirror and the plate.

15. The apparatus of claim 13, including
a plurality of sectors of the diaphragm that are electrically isolated from each other, the controller and the coils are electrically coupled to each other through at least four of the plurality of sectors, the current flowing through the at least four of the plurality of sectors; and
electrical contacts on an inner diameter and an outer diameter of the at least four sectors, the respective inner diameter electrical contacts of the at least four sectors coupled to at least one coil, the respective outer diameter electrical contacts of the at least four sectors coupled to the controller.

16. The apparatus of claim 13, including
clamp rings for mounting the electrically conductive diaphragm between the drive plate and the mirror; and
insulating rings for electrically isolating the electrically conductive diaphragm from the clamp rings.

17. The apparatus of claim 13, including
a serpentine pattern cutout of the electrically conductive diaphragm such that each sector has an electrically conductive path from an outer diameter of each sector to an inner diameter of each sector.

18. The apparatus of claim 14,
wherein the installation tabs are located at an inner diameter and an outer diameter of the sectors.

19. The apparatus of claim 15
wherein two sectors complete an electrical circuit between two series wired coils and two power terminals of the controller, the current provided by the controller flowing from the outer diameter of the sectors to the inner diameter of the sectors and through the coils.

\* \* \* \* \*